United States Patent
Iwata et al.

(10) Patent No.: US 10,365,020 B2
(45) Date of Patent: Jul. 30, 2019

(54) HEAT PUMP

(71) Applicant: KABUSHIKI KAISHA TOYOTA CHUO KENKYUSHO, Nagakute-shi, Aichi-ken (JP)

(72) Inventors: Ryuichi Iwata, Nagakute (JP); Takafumi Yamauchi, Nagakute (JP); Yasuki Hirota, Nagakute (JP); Takashi Shimazu, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 318 days.

(21) Appl. No.: 15/136,280

(22) Filed: Apr. 22, 2016

(65) Prior Publication Data

US 2016/0320109 A1    Nov. 3, 2016

(30) Foreign Application Priority Data

Apr. 28, 2015    (JP) .................................. 2015-091910

(51) Int. Cl.
| | |
|---|---|
| *F25B 41/00* | (2006.01) |
| *F25B 30/04* | (2006.01) |
| *F25B 17/08* | (2006.01) |
| *F25B 37/00* | (2006.01) |

(52) U.S. Cl.
CPC ............ *F25B 30/04* (2013.01); *F25B 17/083* (2013.01); *F25B 37/00* (2013.01); *F25B 41/00* (2013.01); *Y02A 30/278* (2018.01); *Y02B 30/64* (2013.01)

(58) Field of Classification Search
CPC .......... F25B 30/04; F25B 37/00; F25B 41/00; F25B 17/083; Y02A 30/278; Y02B 30/64

USPC ........................................................... 62/478
See application file for complete search history.

(56) References Cited

U.S. PATENT DOCUMENTS

| | | | | |
|---|---|---|---|---|
| 4,121,432 A | * | 10/1978 | Weil ..................... | F24F 3/1423 62/79 |
| 4,574,874 A | * | 3/1986 | Duran ..................... | C09K 5/16 165/43 |
| 4,660,629 A | * | 4/1987 | Maier-Laxhuber ......................... | B60H 1/3201 165/104.12 |
| 5,279,359 A | * | 1/1994 | Erickson ............... | F25B 17/086 165/104.12 |

(Continued)

FOREIGN PATENT DOCUMENTS

JP      2012-127594 A      7/2012

OTHER PUBLICATIONS

Feb. 14, 2017 Office Action issued in Japanese Patent Application No. 2015-091910.

*Primary Examiner* — Filip Zec
(74) *Attorney, Agent, or Firm* — Oliff PLC

(57) ABSTRACT

A switching device sequentially switches from having an evaporator-condenser generate an adsorbate and an adsorbent adsorb the adsorbate, to having an evaporator-condenser condense the adsorbate and an adsorbent desorb the adsorbate, such that the evaporator-condenser that generates the adsorbate and the adsorbent that adsorbs the adsorbate face each other, and the evaporator-condenser that condenses the adsorbate and the adsorbent that desorbs the adsorbate face each other. Accordingly, one adsorbent repeatedly desorbs and adsorbs in alternation, and another adsorbent repeatedly adsorbs and desorbs in alternation.

4 Claims, 20 Drawing Sheets

(56) References Cited

U.S. PATENT DOCUMENTS

| | | | | |
|---|---|---|---|---|
| 5,802,870 A | * | 9/1998 | Arnold | F25B 17/083 |
| | | | | 62/480 |
| 6,158,237 A | * | 12/2000 | Riffat | B01D 3/007 |
| | | | | 165/92 |
| 2014/0284026 A1 | * | 9/2014 | Hirota | F25B 30/04 |
| | | | | 165/63 |

* cited by examiner

HEAT PUMP

CROSS-REFERENCE TO RELATED APPLICATION

This application claims priority under 35 USC 119 from Japanese Patent application No. 2015-091910 filed on Apr. 28, 2015, the disclosure of which is incorporated by reference herein.

BACKGROUND

Technical Field

The present disclosure relates to a heat pump.

Related Art

In an adsorption heat pump described in Japanese Patent Application No. 2012-127594, a heating medium flowing through the interior of an adsorbent is switched between warm water and cold water by rotating a rotor.

In the configuration of Japanese Patent Application No. 2012-127594, plural opening and closing valves are provided at walls separating between the adsorbent and an evaporator, and between the adsorbent and a condenser, and the opening and closing valves open and close such that water vapor is supplied to an adsorption device, or water vapor is expelled to a condenser.

The present disclosure provides a configuration in which one adsorbent repeatedly desorbs and adsorbs in alternation, while another adsorbent repeatedly adsorbs and desorbs in alternation, without employing an opening and closing valve.

SUMMARY

A first aspect of the present disclosure is a heat pump including a vessel, plural evaporator-condensers, plural adsorbents, a flow path member, and a switching device. The vessel includes an adsorption space containing an adsorbate. The plural evaporator-condensers are arranged separated by spacings in the adsorption space, generate the adsorbate through exchanging heat with a first heating medium, and condense the adsorbate through exchanging heat with a second heating medium. The plural adsorbents are alternately arranged with the evaporator-condensers in the adsorption space at separations from the evaporator-condensers, adsorb the adsorbate generated by the evaporator-condensers through exchanging heat with a third heating medium, and desorb the adsorbate through exchanging heat with a fourth heating medium that is at a higher temperature than the third heating medium. The flow path member is formed from a first flow path through which the first heating medium flows, a second flow path through which the second heating medium flows, a third flow path through which the third heating medium flows, and a fourth flow path through which the fourth heating medium flows, such that the evaporator-condenser that generates the adsorbate and the adsorbent that adsorbs the adsorbate face each other, and the evaporator-condenser that condenses the adsorbate and the adsorbent that desorbs the adsorbate face each other. The switching device sequentially switches from having an evaporator-condenser generate the adsorbate and an adsorbent adsorb the adsorbate, to having an evaporator-condenser condense the adsorbate and an adsorbent desorb the adsorbate, by causing the flow path member to move relative to the adsorbents and the evaporator-condensers, such that the evaporator-condenser that generates the adsorbate and the adsorbent that adsorbs the adsorbate face each other, and the evaporator-condenser that condenses the adsorbate and the adsorbent that desorbs the adsorbate face each other.

According to the first aspect, the evaporator-condensers and the adsorbents are alternatingly arranged separated by spacings in the adsorption space of the vessel. The flow path member is formed from a first flow path, a second flow path, a third flow path, and a fourth flow path through which a first heating medium, a second heating medium, a third heating medium, and a fourth heating medium flow, such that an evaporator-condenser that generates an adsorbate and an absorbent that adsorbs an adsorbate face each other, and an evaporator-condenser that condenses an adsorbate and an adsorbent that desorbs an adsorbate face each other.

Thus the adsorbate generated by the evaporator-condenser through exchanging heat with the first heating medium is adsorbed by the adsorbent through exchanging heat with the third heating medium, and the adsorbate desorbed by the adsorbent through exchanging heat with the fourth heating medium is condensed by the evaporator-condenser through exchanging heat with the second heating medium.

The switching device sequentially switches between having an evaporator-condenser generate water vapor and an adsorbent adsorb water vapor, and an evaporator-condenser condense water vapor and an adsorbent desorb water vapor, such that the evaporator-condenser that generates the adsorbate faces the adsorbent that adsorbs the adsorbate, and the evaporator-condenser that condenses the adsorbate faces the adsorbent that desorbs the adsorbate.

Accordingly, a configuration can be obtained in which one adsorbent repeatedly desorbs and adsorbs an adsorbate in alternation, and another adsorbent repeatedly adsorbs and desorbs an adsorbate in alternation, without using an opening and closing valve.

A second aspect of the present disclosure is the heat pump of the first aspect, wherein the evaporator-condensers and the adsorbents are alternately arranged in a circular pattern separated by spacings as viewed from one direction, and the switching device causes the flow path member to rotate relative to the adsorbents and the evaporator-condensers about an axis of the center of the circle in which the evaporator-condensers and the adsorbents are arranged as viewed from the one direction.

According to the second aspect, the evaporator-condensers and the adsorbents are alternately arranged separated by spacings in a circular pattern as viewed from one direction. The switching device causes the flow path member to rotate relative to the adsorbents and the evaporator-condensers about the axis of the center of the circle in which the evaporator-condensers and the adsorbents are arranged as viewed from the one direction.

Thus, by rotating the flow path member, switching can be achieved from having an evaporator-condenser generate the adsorbate to having the evaporator-condenser condense the adsorbate, and from having an adsorbent adsorb the adsorbate to having the adsorbent desorb the adsorbate.

A third aspect of the present disclosure is the heat pump of the second aspect, wherein the evaporator-condensers and the adsorbents are rectangular plate shaped, and a plate face of the evaporator-condensers and a plate face of the adsorbents face along a circumferential direction of the circle in which the evaporator-condensers and the adsorbents are arranged as viewed from the one direction.

According to the third aspect, the evaporator-condensers and the adsorbents are rectangular plate shaped, and the plate face of the evaporator-condensers and the plate face of the adsorbents face along the circumferential direction of the circle in which the evaporator-condensers and the adsorbents are arranged as viewed from the one direction Thus, at one side, at the plate face of the adsorbent the adsorbent adsorbs the adsorbate that was generated at the plate face of the evaporator-condenser by the evaporator-condenser disposed facing the adsorbent, and that was released into the adsorption region. At the other side, at the plate face of the evaporator-condenser the evaporator-condenser condenses the adsorbate that was desorbed from the plate face of the adsorbent by the adsorbent disposed facing the evaporator-condenser, and that was released into the adsorption region.

Due to the evaporator-condensers and the adsorbents being rectangular plate shaped, the surface area for the adsorbent to adsorb the adsorbate, the surface area of the adsorbent from which the adsorbate is desorbed, the surface area of the evaporator-condensers which generate the adsorbate, and the surface area of the evaporator-condensers which condense the adsorbate, can be increased.

According to the present disclosure, a configuration can be obtained in which one adsorbent repeatedly desorbs and adsorbs an adsorbate in alternation, and another adsorbent repeatedly adsorbs and desorbs an adsorbate in alternation, without using an opening and closing valve.

BRIEF DESCRIPTION OF THE DRAWINGS

Exemplary embodiments of the present disclosure will be described in detail based in the following figures, wherein.

DETAILED DESCRIPTION

First Exemplary Embodiment

Figure 1:
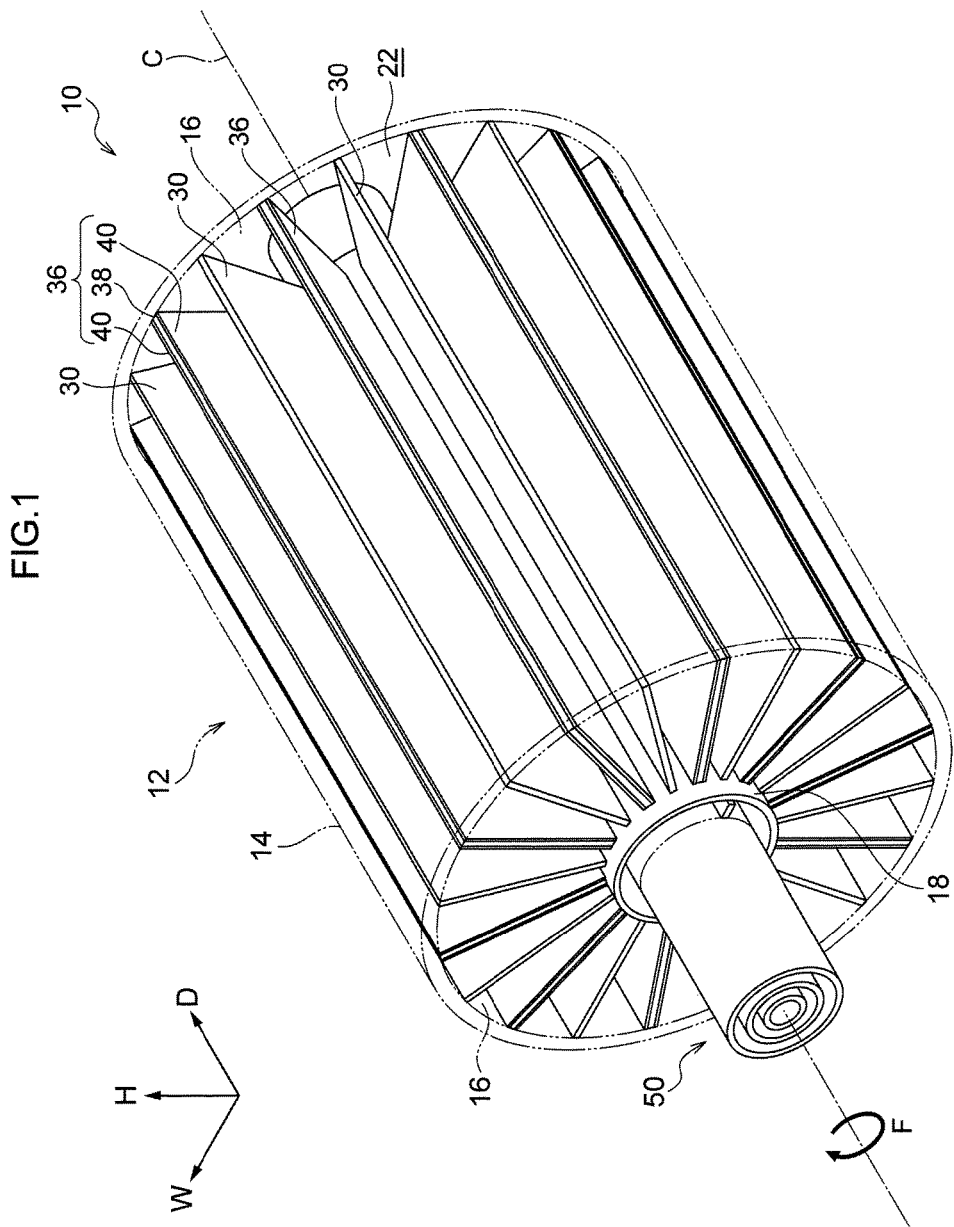
FIG. 1 is a perspective view illustrating an adsorption heat pump according to a first exemplary embodiment.

Explanation follows regarding an example of an adsorption heat pump according to a first exemplary embodiment of the present disclosure, with reference to FIG. 1 to FIG. 11. In the drawings, an arrow H indicates a device up-down direction (vertical direction), an arrow W indicates a device width direction (horizontal direction), and an arrow D indicates a device depth direction (horizontal direction).

Overall Configuration

Figure 2:
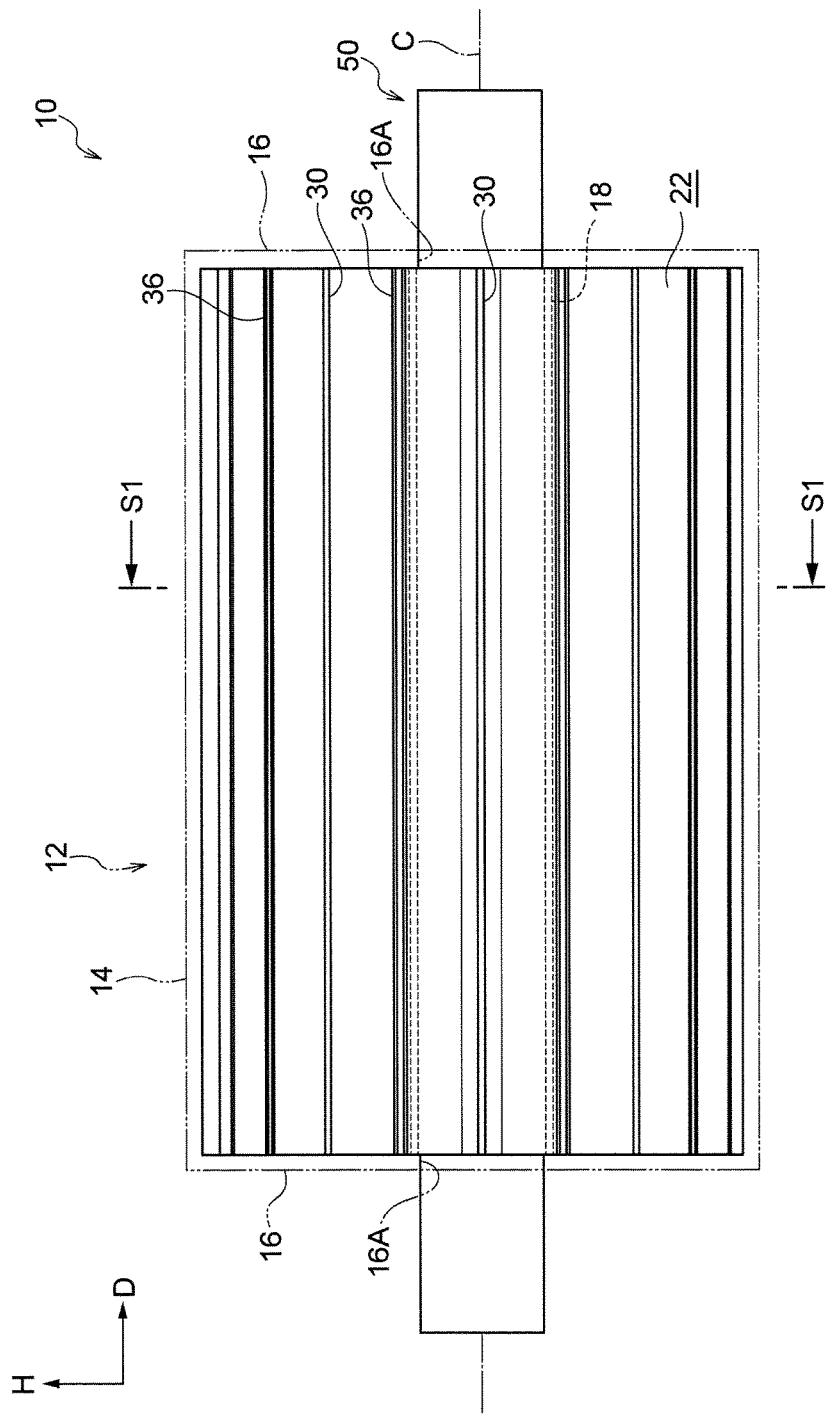
FIG. 2 is a side view illustrating an adsorption heat pump according to the first exemplary embodiment.

As illustrated in FIG. 1 and FIG. 2, an adsorption heat pump 10 ("heat pump 10" hereafter), serving as an example of a heat pump according to the first exemplary embodiment, includes a vessel 12, evaporator-condensers 30 that evaporate water and condense water vapor (an example of an adsorbate), and adsorption sections 36 including an adsorbent 40 that adsorbs and desorbs water vapor. The adsorption heat pump 10 further includes a flow path mechanism 50 serving as an example of a flow path section through which respective heating media flow, and a switching device 90 (see FIG. 5).

The adsorption heat pump 10 is a device capable of, for example, generating a high temperature heating medium F3, described later, using waste heat from, for example, an automobile, and capable of cooling a low temperature heating medium F1, described later, via an adsorption process.

Vessel

As illustrated in FIG. 1, FIG. 2, FIG. 5, and FIG. 6, the vessel 12 is configured including a main body portion 14 formed as a circular cylinder extending along the device depth direction, a pair of lid portions 16 attached to both device depth direction end portions of the main body portion 14, and an axial pipe 18 with an axial line C of the main body portion 14 as its axis.

The axial pipe 18 is disposed in the interior of the main body portion 14, and is disposed between the pair of lid portions 16. Through holes 16A that open the interior of the axial pipe 18 to the exterior of the vessel 12 are respectively provided at the pair of lid portions 16.

A space enclosed by the inner circumferential face of the main body portion 14, the pair of lid portions 16, and the outer circumferential face of the axial pipe 18 configures an adsorption space 22. The adsorption space 22 is vacuum deaerated, and water vapor (an example of an adsorbate) is contained in the adsorption space 22.

Figure 3:
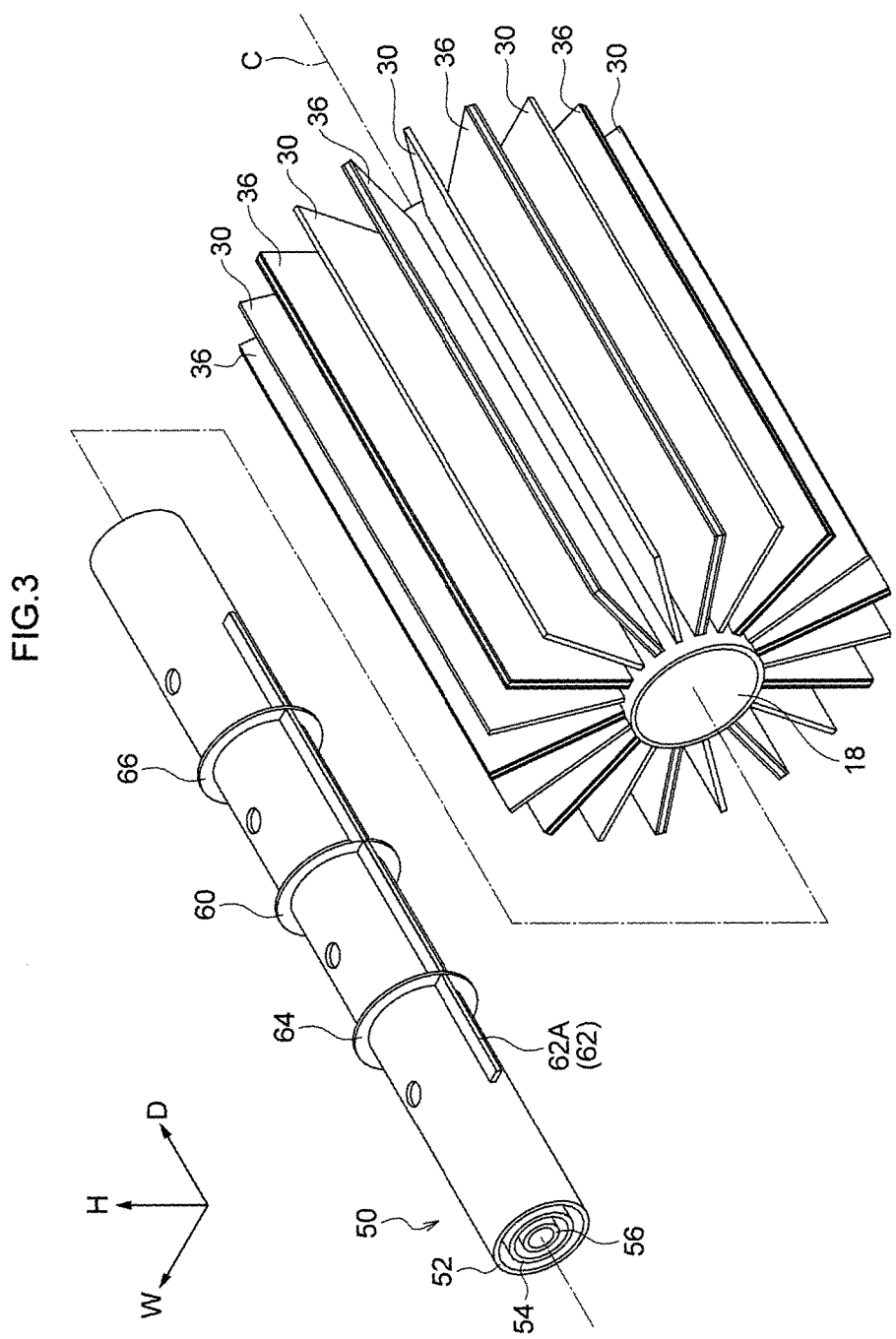
FIG. 3 is an exploded perspective view illustrating an adsorption heat pump according to the first exemplary embodiment.

Evaporator-Condenser Plural units of the evaporator-condenser 30 are provided, and, as illustrated in FIG. 3, the evaporator-condensers 30 are rectangular plate shaped, and are arranged at similar spacings such that plate faces of the evaporator-condensers 30 face along the circumferential direction of the axial pipe 18.

Moreover, a base end portion of each of the evaporator-condensers 30 is attached to the outer circumferential face of the axial pipe 18 of the vessel 12, a leading end portion of each of the evaporator-condensers 30 contacts the inner circumferential face of the main body portion 14 of the vessel 12 (see FIG. 4), and both device depth direction end portions of each of the evaporator-condensers 30 are in contact with the pair of lid portions 16 of the vessel 12 (see FIG. 2).

In the present exemplary embodiment, ten units of the evaporator-condenser 30 are provided, and are arranged around the outer circumferential face of the axial pipe 18 at a 36° pitch.

Figure 6:
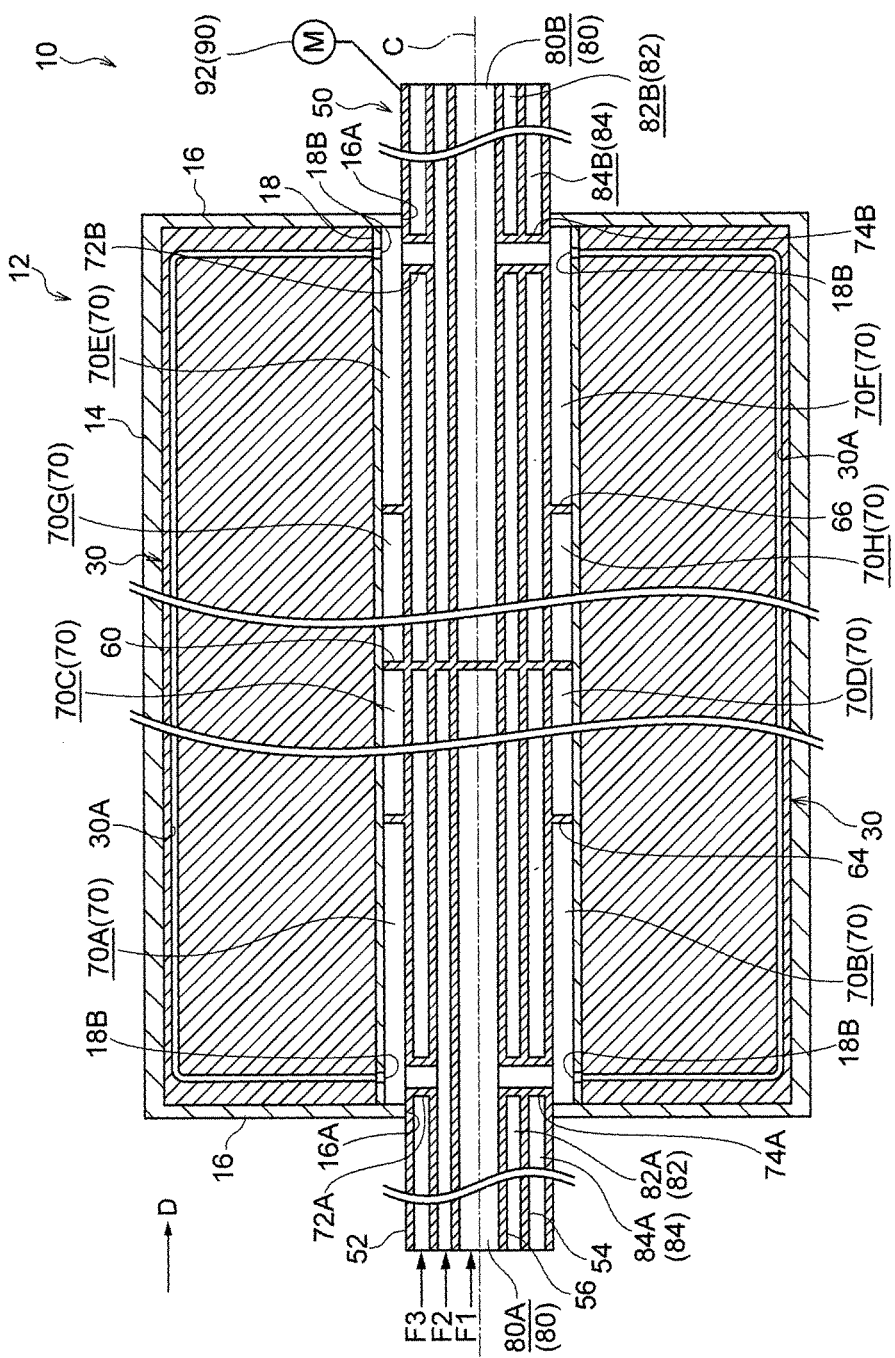
FIG. 6 is a cross-section taken along a line S3-S3 in FIG. 4, illustrating an adsorption heat pump according to the first exemplary embodiment.

As illustrated in FIG. 6, a flow path 30A is formed in the interior of each of the evaporator-condensers 30 so as to follow the edge of the evaporator-condenser 30. Moreover, through holes 18B facing both end portions of the flow path 30A are formed in the axial pipe 18. The flow path 30A and the interior of the axial pipe 18 are thereby placed in communication with each other. Configuration is made such that the low temperature heating medium F1 or an intermediate temperature heating medium F2, described later, flows in the flow path 30A.

Adsorption Section

Plural units of the adsorption section 36 are provided, and, as illustrated in FIG. 3, the adsorption sections 36 are rectangular plate shaped, and are arranged at similar spacings such that the plate faces of the adsorption sections 36 face along the circumferential direction of the axial pipe 18. The adsorption sections 36 and the evaporator-condensers 30 are alternatingly arranged along the circumferential direction of the axial pipe 18.

Moreover, a base end portion of each of the adsorption sections 36 is attached to the outer circumferential face of the axial pipe 18, a leading end portion of each of the adsorption sections 36 contacts the inner circumferential face of the main body portion 14 of the vessel 12 (see FIG. 4), and both device depth direction end portions of each of the adsorption sections 36 contact the pair of lid portions 16 of the vessel 12 (see FIG. 2). Regions 42 (see FIG. 4), serving as an example of an adsorption region, are formed between adsorption sections 36 and evaporator-condensers 30 that are neighboring in the circumferential direction. In the present exemplary embodiment, ten units of the adsorption section 36 are provided, and are arranged at a pitch of 36° along the outer circumferential face of the axial pipe 18.

Figure 7:
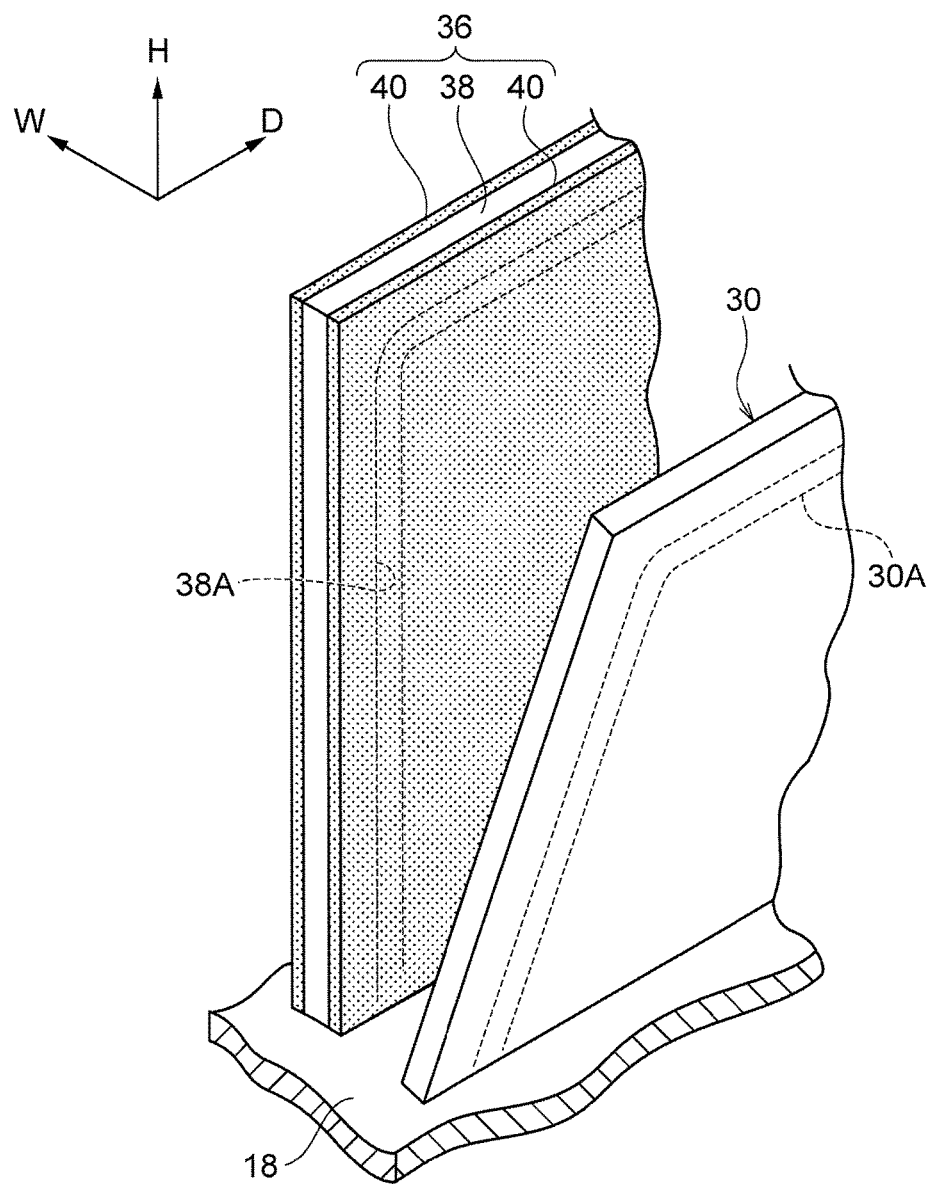
FIG. 7 is an expanded perspective view illustrating an adsorption heat pump according to the first exemplary embodiment.

As illustrated in FIG. 7, each of the adsorption sections 36 has a three-layer configuration that includes an intermediate plate 38, and adsorbents 40 stacked on a front face and a back face of the intermediate plate 38. The adsorbent 40 adsorbs water vapor to generate heat, and desorbs water vapor to absorb heat. For example, activated carbon, mesoporous silica, a zeolite, silica gel, or clay mineral may be employed as the adsorbent 40. In order to stack the adsorbent 40 on the plate faces of the intermediate plate 38, for example, a method of coating a liquid coating that includes an adsorbent onto the intermediate plate 38, or a method of adhering an adsorbent molded body that includes an adsorbent to the intermediate plate 38, may be employed.

Figure 5:
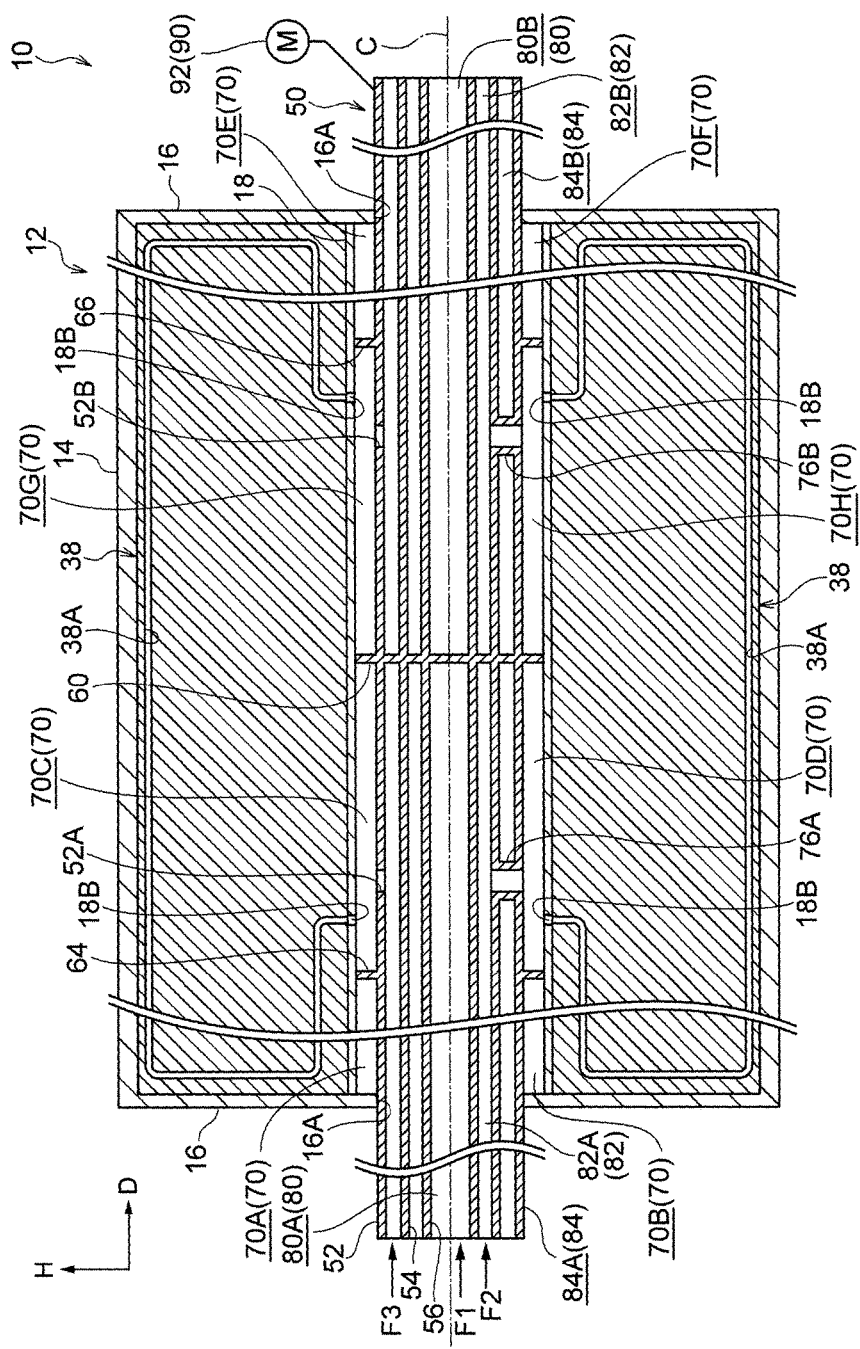
FIG. 5 is a cross-section taken along a line S2-S2 in FIG. 4, illustrating an adsorption heat pump according to the first exemplary embodiment.

As illustrated in FIG. 5, a flow path 38A is formed in the interior of each of the intermediate plates 38 so as to follow the edge of the intermediate plate 38. Moreover, through holes 18B facing both end portions of the flow path 38A are formed in the axial pipe 18. The flow path 38A and the interior of the axial pipe 18 are thereby placed in communication with each other. Configuration is made such that the intermediate temperature heating medium F2 or the high temperature heating medium F3, described later, flows in the flow path 38A.

Flow Path Mechanism

As illustrated in FIG. 3 and FIG. 5, the flow path mechanism 50 includes a first pipe member 52 that penetrates through the axial pipe 18 with a spacing separating the first pipe member 52 from the inner circumferential face of the axial pipe 18, and a second pipe member 54 disposed in the interior of the first pipe member 52 with a spacing separating the second pipe member 54 from the inner circumferential face of the first pipe member 52. The flow path mechanism 50 also includes a third pipe member 56 disposed in the interior of the second pipe member 54 with a space between the third pipe member 56 and the inner circumferential face of the second pipe member 54.

As illustrated in FIG. 5 and FIG. 6, both end sides of the first pipe member 52, the second pipe member 54, and the third pipe member 56 are exposed to the exterior of the vessel 12 from the lid portions 16 through the through holes 16A respectively formed in the pair of lid portions 16 as described above. A bearing shaft, not illustrated in the drawings, is provided between the hole edges of the through holes 16A of the pair of lid portions 16, and the outer circumferential face of the first pipe member 52, such that the flow path mechanism 50 is capable of rotation about the axial line C (see the arrow F in FIG. 1). A sealing member, not illustrated in the drawings, seals between the hole edges of the through holes 16A and the outer circumferential face of the first pipe member 52.

The flow path mechanism 50 includes a circular partitioning plate 60 that partitions the interior of the axial pipe 18 into a space at one device depth direction end side (the left side in the drawings) and a space at the other end side (the right side in the drawings). The partitioning plate 60 is formed integrally with the first pipe member 52, the second pipe member 54, and the third pipe member 56 at a portion at the device depth direction central side of the first pipe member 52. A sealing member, not illustrated in the drawings, seals between the edge portion of the partitioning plate 60 and the inner circumferential face of the axial pipe 18.

Figure 4:
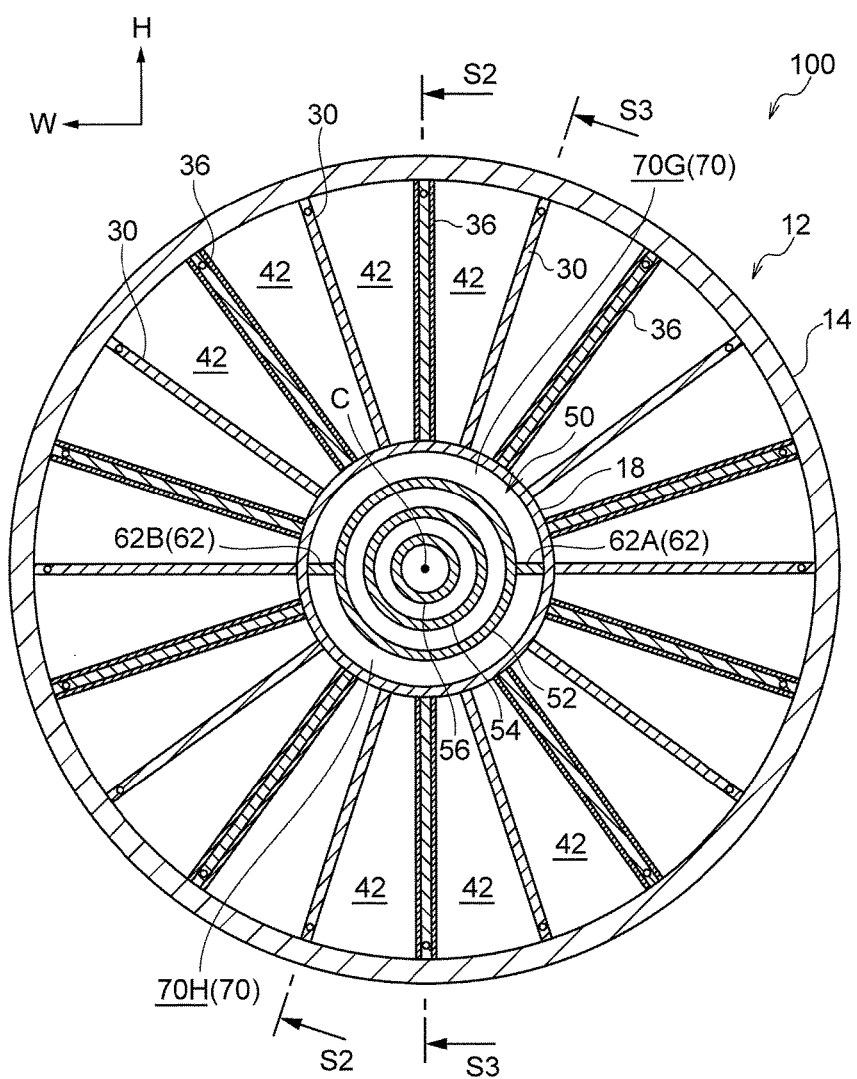
FIG. 4 is a cross-section taken along a line S1-S1 in FIG. 2, illustrating an adsorption heat pump according to the first exemplary embodiment.

As illustrated in FIG. 4, the flow path mechanism 50 includes a partitioning plate 62 that partitions a space 70 between the first pipe member 52 and the axial pipe 18 in the circumferential direction of the axial pipe 18 (the vertical direction in FIG. 4). The partitioning plate 62 is provided from one device depth direction end side to the other device depth direction end side of the axial pipe 18.

A base end portion of the partitioning plate 62 is coupled to the outer circumferential face of the first pipe member 52, and, as viewed along the device depth direction, the partitioning plate 62 includes partitioning plates 62A, 62B having leading end portions that extend from one radial direction side of the first pipe member 52 and that contact the inner circumferential face of the axial pipe 18. As viewed along the device depth direction, the partitioning plate 62A and the partitioning plate 62B are disposed so as to have point symmetry about the axial line C. The partitioning plates 62A, 62B are formed integrally with the first pipe member 52. A sealing member, not illustrated in the drawings, seals between the leading end portions of the partitioning plates 62A, 62B and the inner circumferential face of the axial pipe 18.

As illustrated in FIG. 5 and FIG. 6, the flow path mechanism 50 includes a ring shaped partitioning plate 64 that partitions the space 70 at the one device depth direction end side (the left side in the drawings) of the partitioning plate 60 into two spaces in the device depth direction. The partitioning plate 64 is integrally formed with the first pipe member 52. A sealing member, not illustrated in the drawings, seals between the edge portion of the partitioning plate 64 and the inner circumferential face of the axial pipe 18.

The flow path mechanism 50 includes a ring shaped partitioning plate 66 that partitions the space 70 at the other device depth direction end side (the right side in the drawings) of the partitioning plate 60 into two spaces in the device depth direction. The partitioning plate 66 is formed integrally with the first pipe member 52. A sealing member, not illustrated in the drawings, seals between the edge portion of the partitioning plate 66 and the inner circumferential face of the axial pipe 18.

In the following explanation, when the space 70 is partitioned in the vertical direction by the partitioning plate 62, which rotates together with the first pipe member 52, a space in the space 70 that is partitioned by the partitioning plate 64 and the partitioning plate 62 and is positioned at the lid portion 16 side of the device depth direction one end side and at the upper side of FIG. 5 and FIG. 6, is referred to as a space 70A. Moreover, a space at the opposite side of the partitioning plate 62 to the space 70A is referred to as a space 70B. Moreover, in the space 70, a space at the opposite side of the partitioning plate 64 to the space 70A is referred to as a space 70C, and a space at the opposite side of the partitioning plate 64 to the space 70B is referred to as a space 70D.

Moreover, in the space 70, a space at the opposite side of the partitioning plate 60 to the space 70A is referred to as a space 70E, and a space at the opposite side of the partitioning plate 60 to the 70B is referred to as a space 70F. Moreover, in the space 70, a space at the opposite side of the partitioning plate 60 to the space 70C is referred to as a space 70G, and a space at the opposite side of the partitioning plate 60 to the space 70D is referred to as a space 70H.

As illustrated in FIG. 6, the flow path mechanism 50 includes a coupling pipe 72A coupling the first pipe member 52 to the second pipe member 54, at a portion of the one end side of the first pipe member 52 and at a portion that contacts the space 70A. The flow path mechanism 50 also includes a coupling pipe 72B coupling the first pipe member 52 to the second pipe member 54, at a portion of the other end side of the first pipe member 52 and at a portion in contact with the space 70E. The coupling pipes 72A, 72B place a space between the second pipe member 54 and the third pipe member 56 (a flow path 82, described later) in communication with the spaces 70A, 70E.

As illustrated in FIG. 6, the flow path mechanism 50 also includes a coupling pipe 74A coupling the first pipe member 52 to the third pipe member 56, at a portion at the one end side of the first pipe member 52, and at a portion in contact with the space 70B. The flow path mechanism 50 also includes a coupling pipe 74B coupling the first pipe member 52 to the third pipe member 56, at a portion at the other end side of the first pipe member 52, and at a portion in contact with the space 70F. The coupling pipes 74A, 74B place a space in the interior of the third pipe member 56 (a flow path 80, described later) in communication with the spaces 70B, 70F.

As illustrated in FIG. 5, a through hole 52A penetrating a wall portion of the first pipe member 52 is formed at a portion at the one end side of the first pipe member 52 and at a portion in contact with the space 70C. A through hole 52B penetrating through a wall portion of the first pipe member 52 is formed at a portion at the other end side of the first pipe member 52 and at a portion contacting the space 70G. The through holes 52A, 52B place a space between the first pipe member 52 and the second pipe member 54 (a flow path 84, described later) in communication with the spaces 70C, 70G.

As illustrated in FIG. 5, the flow path mechanism 50 includes a coupling pipe 76A coupling the first pipe member 52 to the second pipe member 54, at a portion at the one end side of the first pipe member 52, and at a portion contacting the space 70D. The flow path mechanism 50 also includes a coupling pipe 76B coupling the first pipe member 52 to the second pipe member 54, at a portion at the other end side of the first pipe member 52, and at a portion contacting the space 70H. The coupling pipes 76A, 76B thereby place a space between the second pipe member 54 and the third pipe member 56 (a flow path 82, described later) in communication with the spaces 70D, 70H.

The interior of the third pipe member 56 configures a flow path 80 (an example of a first flow path) through which the low temperature heating medium F1 (an example of a first heating medium) flows. The space between the second pipe member 54 and the third pipe member 56 configures a flow path 82 (an example of a second flow path and a third flow path) through which the intermediate temperature heating medium F2 (an example of a second heating medium and a third heating medium) flows. A space between the first pipe member 52 and the second pipe member 54 configures a flow path 84 (an example of a fourth flow path) through which the high temperature heating medium F3 (an example of a fourth heating medium) flows.

Water having a temperature of, for example, approximately 15° C. may be employed as the low temperature heating medium F1. Water having a temperature of, for example, approximately 40° C. may be employed as the intermediate temperature heating medium F2. Water having a temperature of, for example, approximately 90° C. may be employed as the high temperature heating medium F3. The high temperature heating medium F3 transports waste heat from, for example, an automobile, and is a fluid for utilization in the adsorption heat pump 10. Moreover, the low temperature heating medium F1 is a fluid to be cooled.

The flow path 80 is partitioned by the partitioning plate 60, and in the following explanation, as illustrated in FIG. 5 and FIG. 6, a portion of the flow path 80 at one device depth direction end side is referred to as a flow path 80A, and a portion of the flow path 80 at the other end side is referred to as a flow path 80B. The flow path 82 is also partitioned by the partitioning plate 60, a portion of the flow path 82 at one device depth direction end side is referred to as a flow path 82A, and a portion of the flow path 82 at the other end side is referred to as a flow path 82B. A portion of the flow path 84 partitioned by the partitioning plate 60 at one device depth direction end side is referred to as a flow path 84A, and a portion of the flow path 84 at the other end side is referred to as a flow path 84B.

As illustrated in FIG. 6, in this configuration, the low temperature heating medium F1 is supplied to the flow path 80A, and flows into the space 70B through the coupling pipe 74A. The low temperature heating medium F1 that has flowed into the space 70B flows, through the one end portion of the flow path 30A, into the interior of the flow path 30A of the evaporator-condenser 30 disposed at the opposite side of the wall portion of the axial pipe 18 to the space 70B. The low temperature heating medium F1 that has flowed into the interior of the flow path 30A flows out from the other end portion of the flow path 30A, and flows into the space 70F. The low temperature heating medium F1 that has flowed into the space 70F flows into the flow path 80B through the coupling pipe 74B, and is expelled to the exterior.

As illustrated in FIG. 6, the intermediate temperature heating medium F2 is supplied to the flow path 82A, and flows into the space 70A through the coupling pipe 72A. The intermediate temperature heating medium F2 that has flowed into the space 70A flows, through the one end portion of the flow path 30A, into the interior of the flow path 30A of the evaporator-condenser 30 disposed at the opposite side of the wall portion of the axial pipe 18 to the space 70A. The intermediate temperature heating medium F2 that has flowed into the interior of the flow path 30A flows out from the other end portion of the flow path 30A, and flows into the space 70E. The intermediate temperature heating medium F2 that has flowed into the space 70E flows into the flow path 82B through the coupling pipe 72B, and is expelled to the exterior.

The intermediate temperature heating medium F2 also flows through a flow path that is a different flow path from the flow path described above. More specifically, as illustrated in FIG. 5, the intermediate temperature heating medium F2 is supplied to the flow path 82A, and flows into the space 70D through the coupling pipe 76A. The intermediate temperature heating medium F2 that has flowed into the space 70D flows, through the one end portion of the flow path 38A, into the interior of the flow path 38A of the intermediate plate 38 of the adsorption section 36 disposed at the opposite side of the wall portion of the axial pipe 18 to the space 70D. The intermediate temperature heating medium F2 that has flowed into the interior of the flow path 38A flows out from the other end portion of the flow path 38A and flows into the space 70H. The intermediate temperature heating medium F2 that has flowed into the space 70H flows into the flow path 82B through the coupling pipe 76B, and is expelled to the exterior.

As illustrated in FIG. 5, the high temperature heating medium F3 is supplied to the flow path 84A, and flows into the space 70C through the through hole 52A. The high temperature heating medium F3 that has flowed into the space 70C flows, through the one end portion of the flow path 38A, into the interior of the flow path 38A of the intermediate plate 38 of the adsorption section 36 disposed at the opposite side of the wall portion of the axial pipe 18 to the space 70C. The high temperature heating medium F3 that has flowed into the interior of the flow path 38A flows out from the other end portion of the flow path 38A and flows into the space 70G. The high temperature heating medium F3 that has flowed into the space 70G flows into the flow path 84B through the through hole 52B, and is expelled to the exterior.

Switching Device

As illustrated in FIG. 5 and FIG. 6, the switching device 90 includes a motor 92 that serves as a driving member for continuously rotating the flow path mechanism 50 about the axial line C.

In this configuration, the flow path mechanism 50 is rotated (see the arrow F in FIG. 1) by the driving force of the motor 92, so as to also rotate each of the spaces 70A to 70H.

Operation

Next, explanation follows regarding operation of the adsorption heat pump 10 based on the action of the adsorption heat pump 10. As illustrated in FIG. 4, in an initial state, the plate faces of the partitioning plates 62A, 62B face, for example, in the vertical direction. The adsorbents 40 disposed at the upper side with respect to the axial line C adopt a state in which water vapor has been adsorbed, and the adsorbents 40 disposed at the lower side with respect to the axial line C adopt a state in which water vapor has been desorbed. Moreover, water (water droplets) adheres to the plate faces of the evaporator-condensers 30 disposed at the lower side with respect to the axial line C.

In this state, as illustrated in FIG. 6, the low temperature heating medium F1 is supplied to the flow path 80A and flows into the space 70B through the coupling pipe 74A. The low temperature heating medium F1 that has flowed into the space 70B flows, through the one end portion of the flow path 30A, into the interior of the flow path 30A of the evaporator-condenser 30 disposed at the opposite side of the wall portion of the axial pipe 18 to the space 70B. The low temperature heating medium F1 that has flowed into the interior of the flow path 30A flows out from the other end portion of the flow path 30A and flows into the space 70F. The low temperature heating medium F1 that has flowed into the space 70F flows into the flow path 80B through the coupling pipe 74B and is expelled to the exterior.

Thus, the low temperature heating medium F1 flows into the flow path 30A of the evaporator-condenser 30 disposed at the lower side with respect to the axial line C.

As illustrated in FIG. 5, the intermediate temperature heating medium F2 is supplied to the flow path 82A and flows into the space 70D through the coupling pipe 76A. The intermediate temperature heating medium F2 that has flowed into the space 70D flows, through the one end portion of the flow path 38A, into the interior of the flow path 38A of the intermediate plate 38 of the adsorption section 36 disposed at the opposite side of the wall portion of the axial pipe 18 to the space 70D. The intermediate temperature heating medium F2 that has flowed into the interior of the flow path 38A flows out from the other end portion of the flow path 38A and flows into the space 70H. The intermediate temperature heating medium F2 that has flowed into the space 70H flows into the flow path 82B through the coupling pipe 76B and is expelled to the exterior.

Thus, the intermediate temperature heating medium F2 flows into the flow path 38A of the intermediate plate 38 of the adsorption section 36 disposed at the lower side with respect to the axial line C.

Here, the low temperature heating medium F1 flowing through the flow path 30A of the evaporator-condenser 30 is at 15° C., as an example. Thus, as an example, the equilibrium pressure in the evaporator-condenser 30 is 1.7 kPa when the water and the water vapor reach a state of equilibrium.

The intermediate temperature heating medium F2 flowing through the flow path 38A of the intermediate plate 38 of the adsorption section 36 is at 40° C., as an example. Thus, as an example, the equilibrium pressure in the adsorbent 40 of the adsorption section 36 is 0.3 kPa when the water and the water vapor reach a state of equilibrium.

Due to the difference in the equilibrium pressure, the evaporator-condenser 30 disposed at the lower side with respect to the axial line C evaporates water adhered to the plate face of the evaporator-condenser 30 through heat exchange with the low temperature heating medium F1, thereby generating water vapor. The adsorbent 40 disposed at the lower side with respect to the axial line C adsorbs water vapor evaporated by the evaporator-condenser 30, through heat exchange with the intermediate temperature heating medium F2 (adsorption process).

Figure 8A:
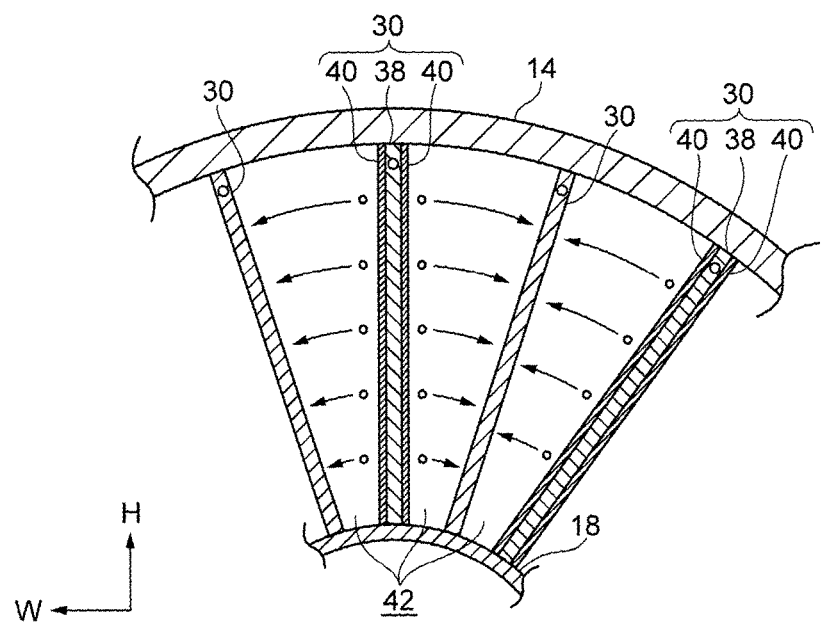
FIG. 8A is a cross-section illustrating an adsorption heat pump according to the first exemplary embodiment.
Figure 8B:
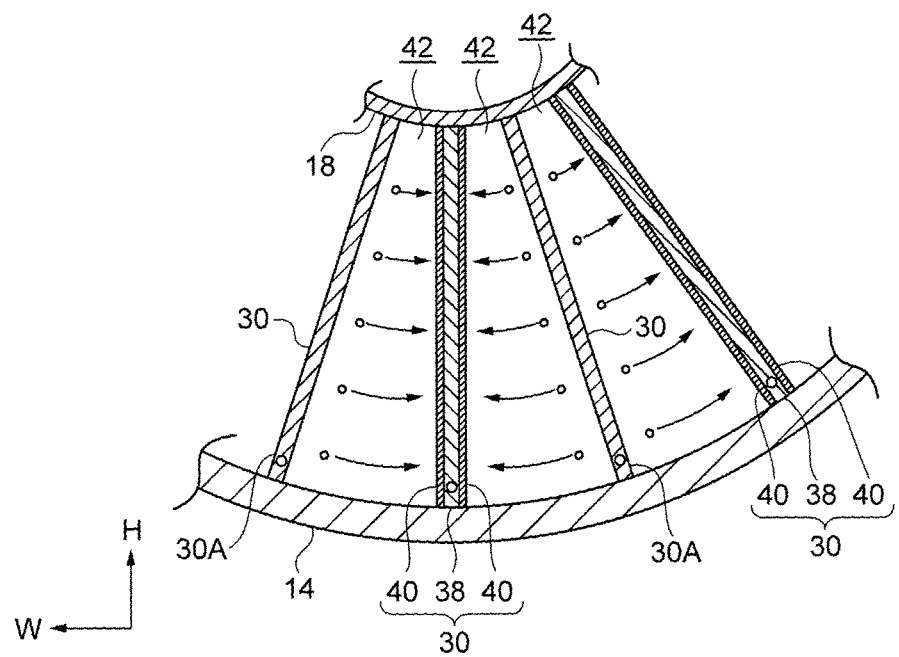
FIG. 8B is a cross-section illustrating an adsorption heat pump according to the first exemplary embodiment.

More specifically, as illustrated in FIG. 8B, water vapor evaporated at the plate face of the evaporator-condenser 30 migrates to a region 42, and is adsorbed by the adsorbent 40 disposed facing the evaporator-condenser 30 across the region 42.

The low temperature heating medium F1 flowing through the flow path 30A of the evaporator-condenser 30 is thereby cooled due to the heat of vaporization when the water is evaporated.

As illustrated in FIG. 6, the intermediate temperature heating medium F2 is supplied to the flow path 82A and flows to the space 70A through the coupling pipe 72A. The intermediate temperature heating medium F2 that has flowed into the space 70A flows, through the one end portion of the flow path 30A, into the interior of the flow path 30A of the evaporator-condenser 30 disposed at the opposite side of the wall portion of the axial pipe 18 to the space 70A. The intermediate temperature heating medium F2 that has flowed into the interior of the flow path 30A flows out from the other end portion of the flow path 30A and flows to the space 70E. The intermediate temperature heating medium F2 that has flowed into the space 70E flows into the flow path 82B through the coupling pipe 72B and is expelled to the exterior. Thus, the intermediate temperature heating medium F2 flows in the flow path 30A of the evaporator-condenser 30 disposed the upper side with respect to the axial line C.

As illustrated in FIG. 5, the high temperature heating medium F3 is supplied to the flow path 84A and flows into the space 70C through the through hole 52A. The high temperature heating medium F3 that has flowed into the space 70C flows, through the one end portion of the flow path 38A, into the interior of the flow path 38A of the intermediate plate 38 of the adsorption section 36 disposed at the opposite side of the wall portion of the axial pipe 18 to the space 70C. The high temperature heating medium F3 that has flowed into the interior of the flow path 38A flows out from the other end portion of the flow path 38A and flows into the space 70G. The high temperature heating medium F3 that has flowed into the space 70G flows into the flow path 84B through the through hole 52B and is expelled to the exterior.

Thus, the high temperature heating medium F3 flows through the flow path 38A of the intermediate plate 38 of the adsorption section 36 disposed at the upper side with respect to the axial line C.

Here, the intermediate temperature heating medium F2 flowing through the flow path 30A of the evaporator-condenser 30 is 40° C., as an example. Thus, as an example, the equilibrium pressure is 7.2 kPa in the evaporator-condenser 30 when the water and the water vapor reach a state of equilibrium.

The high temperature heating medium F3 flowing through the flow path 38A of the intermediate plate 38 of the adsorption section 36 is 90° C., as an example. Thus, as an example, the equilibrium pressure in the adsorbent 40 of the adsorption section 36 is 10.0 kPa when the water and the water vapor reach a state of equilibrium.

Due to the difference in equilibrium pressure, the adsorbent 40 disposed at the upper side with respect to the axial line C desorbs the adsorbed water vapor through heat exchange with the high temperature heating medium F3. The evaporator-condenser 30 disposed at the upper side with respect to the axial line C then condenses the water vapor that was desorbed by the adsorbent 40 (desorption process).

More specifically, as illustrated in FIG. 8A, the water vapor that was desorbed by the adsorbent 40 migrates to the region 42, and is condensed by the evaporator-condenser 30 disposed at the opposite side of the adsorbent 40 to the region 42. The water generated by condensation adheres to the plate face of the evaporator-condenser 30 as water droplets.

Figure 9:
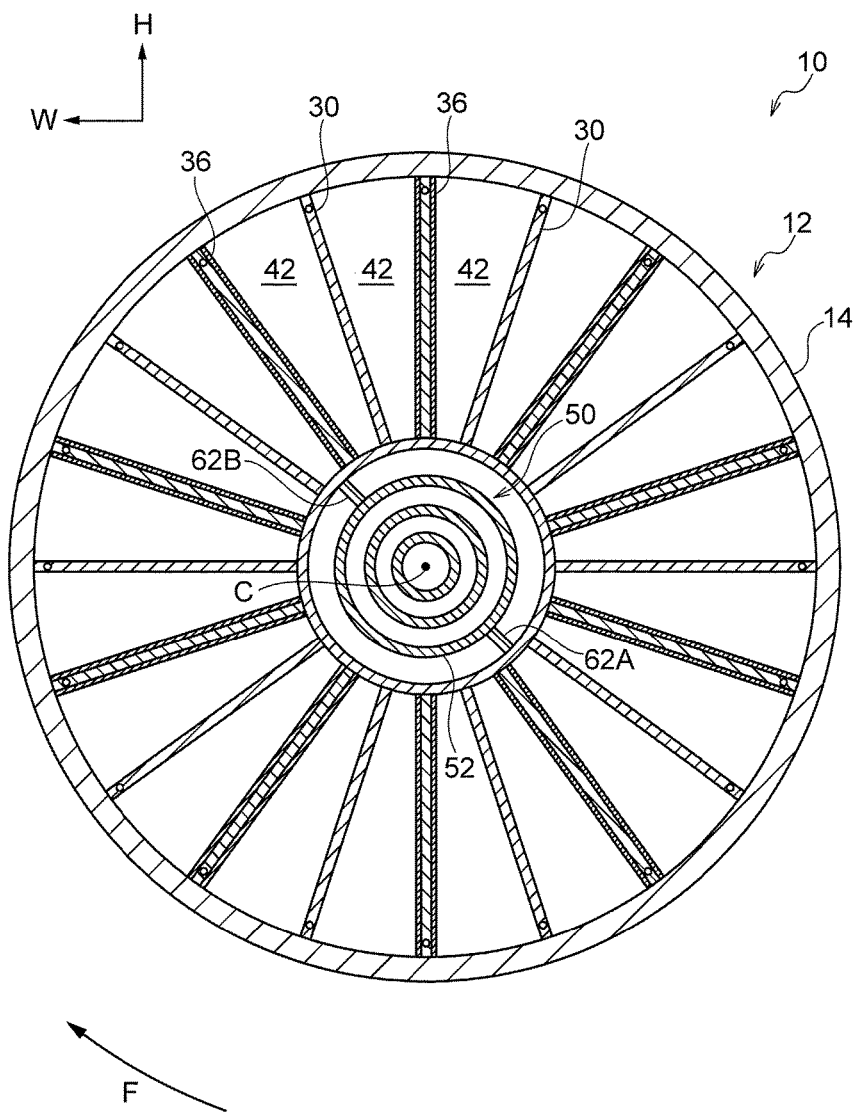
FIG. 9 is a cross-section illustrating an adsorption heat pump according to the first exemplary embodiment.
Figure 10:
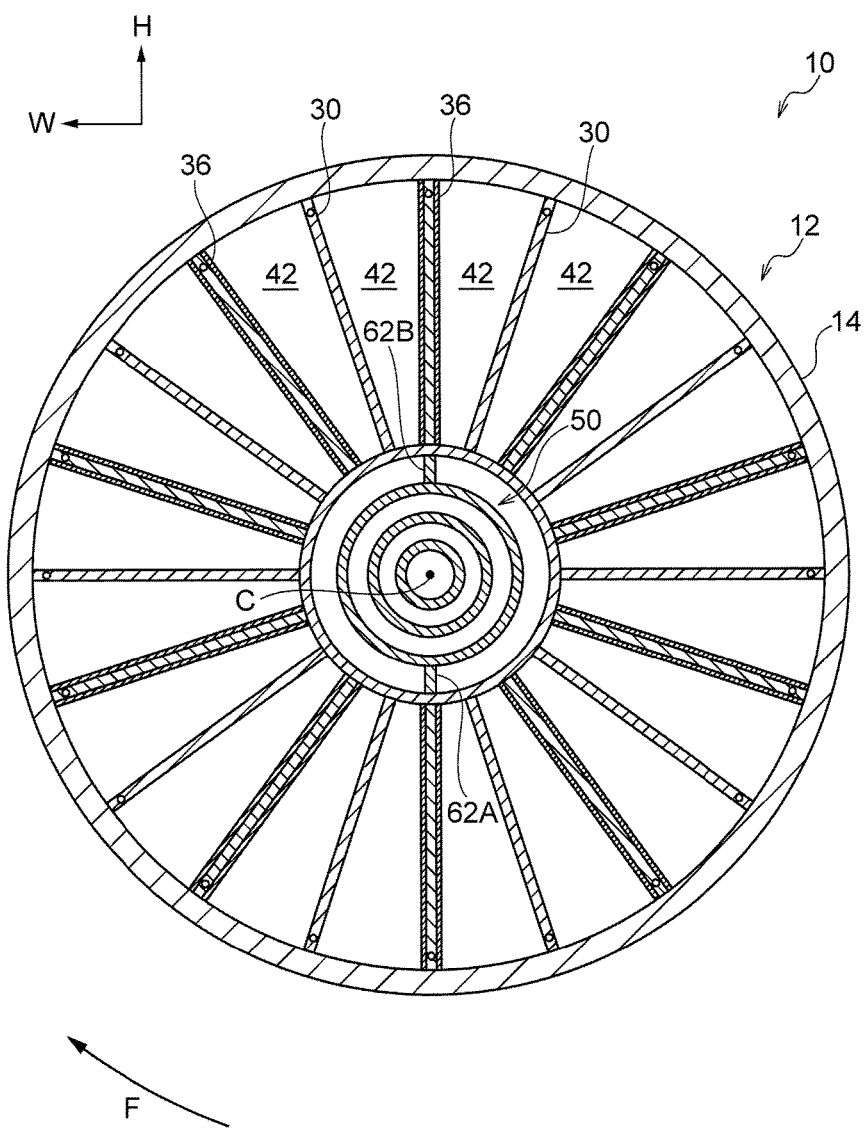
FIG. 10 is a cross-section illustrating an adsorption heat pump according to the first exemplary embodiment.
Figure 11:
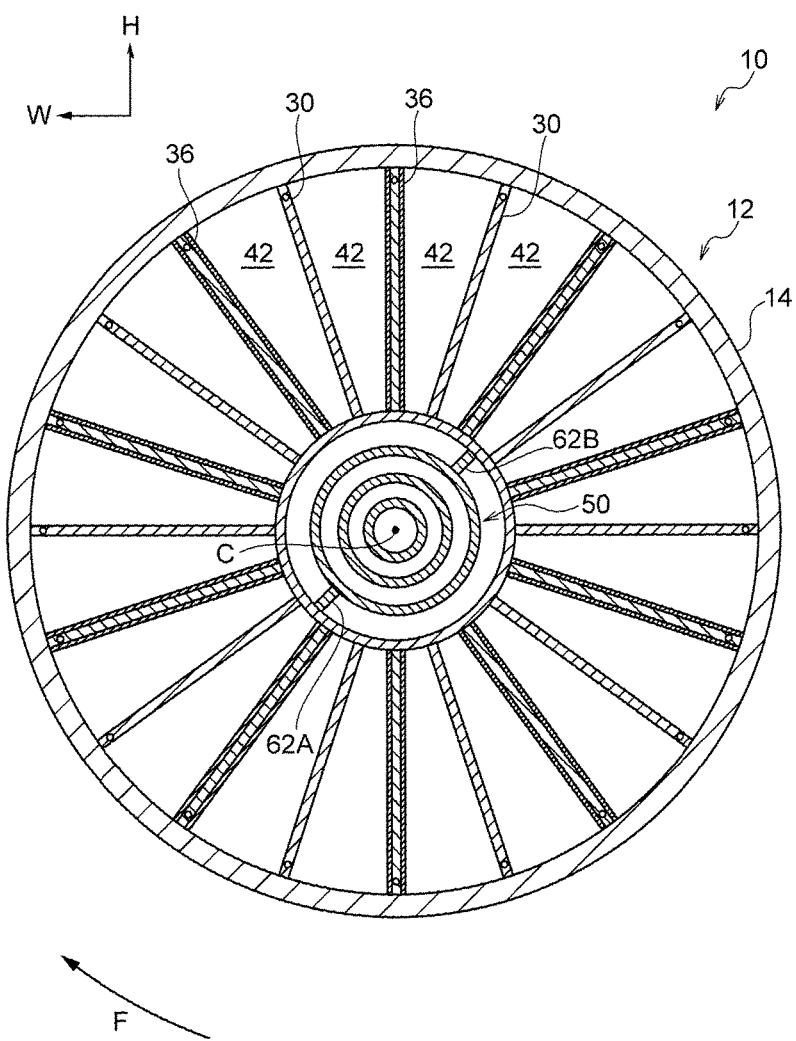
FIG. 11 is a cross-section illustrating an adsorption heat pump according to the first exemplary embodiment.

As illustrated in FIG. 9, FIG. 10, and FIG. 11, the motor 92 (see FIG. 6) rotates the flow path mechanism 50 in the direction of the arrow F in the drawings. Accordingly, sequential switching is made from having the evaporator-condensers 30 generate water vapor and the adsorption sections 36 including the adsorbents 40 adsorb water vapor, to having the evaporator-condensers 30 condense water vapor and the adsorption sections 36 including the adsorbents 40 desorb water vapor, by rotating (moving) each of the spaces 70 such that the evaporator-condensers 30 that generate water vapor and the adsorbents 40 that adsorb water vapor face each other, and the evaporator-condensers 30 that condense water vapor and the adsorbents 40 that desorb water vapor face each other.

The rotation speed at which the flow path mechanism 50 is rotated by the driving force of the motor 92 is determined such that the adsorbent 40 reaches a state of equilibrium at the temperature of the region 42 in contact with the adsorbent 40 in one cycle of the adsorption process, and the adsorbent 40 reaches a state of equilibrium at the temperature of the region 42 in contact with the adsorbent 40 in one cycle of the desorption process.

Conclusion

As explained above, as viewed along the device depth direction, water vapor evaporated at the plate faces of the evaporator-condensers 30 at one radial direction side of the axial pipe 18 migrates through the regions 42, and is adsorbed by the adsorbents 40 disposed facing the evaporator-condensers 30 across the regions 42. On the other hand, as viewed along the device depth direction, the water vapor that was desorbed by the adsorbents 40 at the other radial direction side of the axial pipe 18 migrates through the regions 42 and is condensed by the evaporator-condensers 30 disposed facing the adsorbents 40 across the regions 42. The water generated by the condensation adheres to the plate faces of the evaporator-condensers 30 as water droplets.

Accordingly, the rotation of the flow path mechanism 50 rotates each of the spaces 70, and the evaporator-condensers 30 that generate the water vapor and the adsorption sections 36 that include the adsorbents 40 that adsorb the water vapor, and the evaporator-condensers 30 that condense the water vapor and the adsorption sections 36 that include the adsorbents 40 that desorb the water vapor, are sequentially switched. This enables a configuration to be obtained in which, at the one side, (one of) the adsorbents 40 repeatedly desorbs and adsorbs in alternation, and (one of) the evaporator-condensers 30 repeatedly condense and evaporate in alternation, and, at the other side, (another one of) the adsorbents 40 repeatedly adsorbs and desorbs in alternation, and (another one of) the evaporator-condensers 30 repeatedly evaporates and condenses in alternation, without using an opening and closing a valve.

In the first exemplary embodiment, the evaporator-condensers 30 and the adsorption sections 36 (the adsorbents 40) are arranged in a circular pattern separated by spacings as viewed along the device depth direction. The motor 92 can accordingly switch the heating medium flowing through the flow paths 30A of the evaporator-condensers 30 and the flow paths 38A of the adsorption sections 36 by just rotating the flow path mechanism 50 about the axial line C.

In the first exemplary embodiment, the evaporator-condensers 30 and the adsorption sections 36 (the adsorbents 40) are rectangular plate shaped. In the adsorption process, the water vapor evaporated on the plate face of the evaporator-condenser 30 by the evaporator-condenser 30 migrates through the regions 42 and is adsorbed on the plate faces of the adsorbents 40 by the adsorbents 40 disposed facing the evaporator-condensers 30 across the regions 42. In the desorption process, the water vapor desorbed on the plate faces of the adsorbents 40 by the adsorbents 40 migrates through the regions 42 and is condensed on the plate faces of the evaporator-condensers 30 by the evaporator-condensers 30 disposed facing the adsorbents 40 across the regions 42. Water generated by the condensation then adheres to the plate faces of the evaporator-condensers 30. The surface area of the adsorbents 40 on which water vapor is adsorbed, and the surface area of the adsorbents 40 from which water vapor is desorbed, can thus be increased compared to cases in which, for example, evaporator-condensers and adsorbents are pipe shaped. The surface area of the evaporator-condensers 30 on which water vapor is generated, and the surface area of the evaporator-condensers 30 on which water vapor is condensed, can also be increased.

Second Exemplary Embodiment

Next, explanation follows regarding an example of a heat pump according to a second exemplary embodiment of the present disclosure, with reference to FIG. 12 to FIG. 20. Members and the like similar to those of the first exemplary embodiment are allocated the same reference numerals, explanation thereof is omitted, and explanation mainly focuses on portions different from those of the first exemplary embodiment.

Overall Configuration

Figure 12:
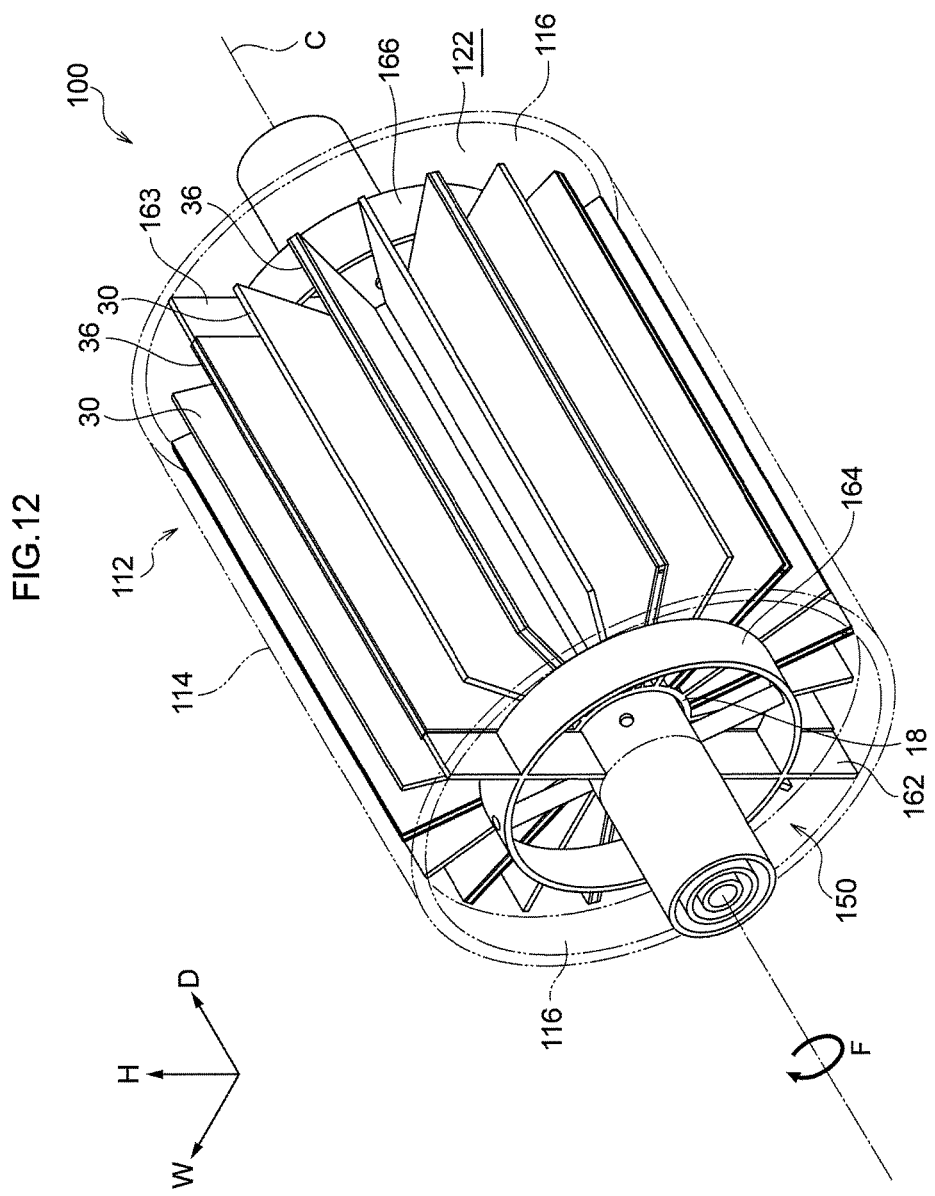
FIG. 12 is a perspective view illustrating an adsorption heat pump according to a second exemplary embodiment.
Figure 13:
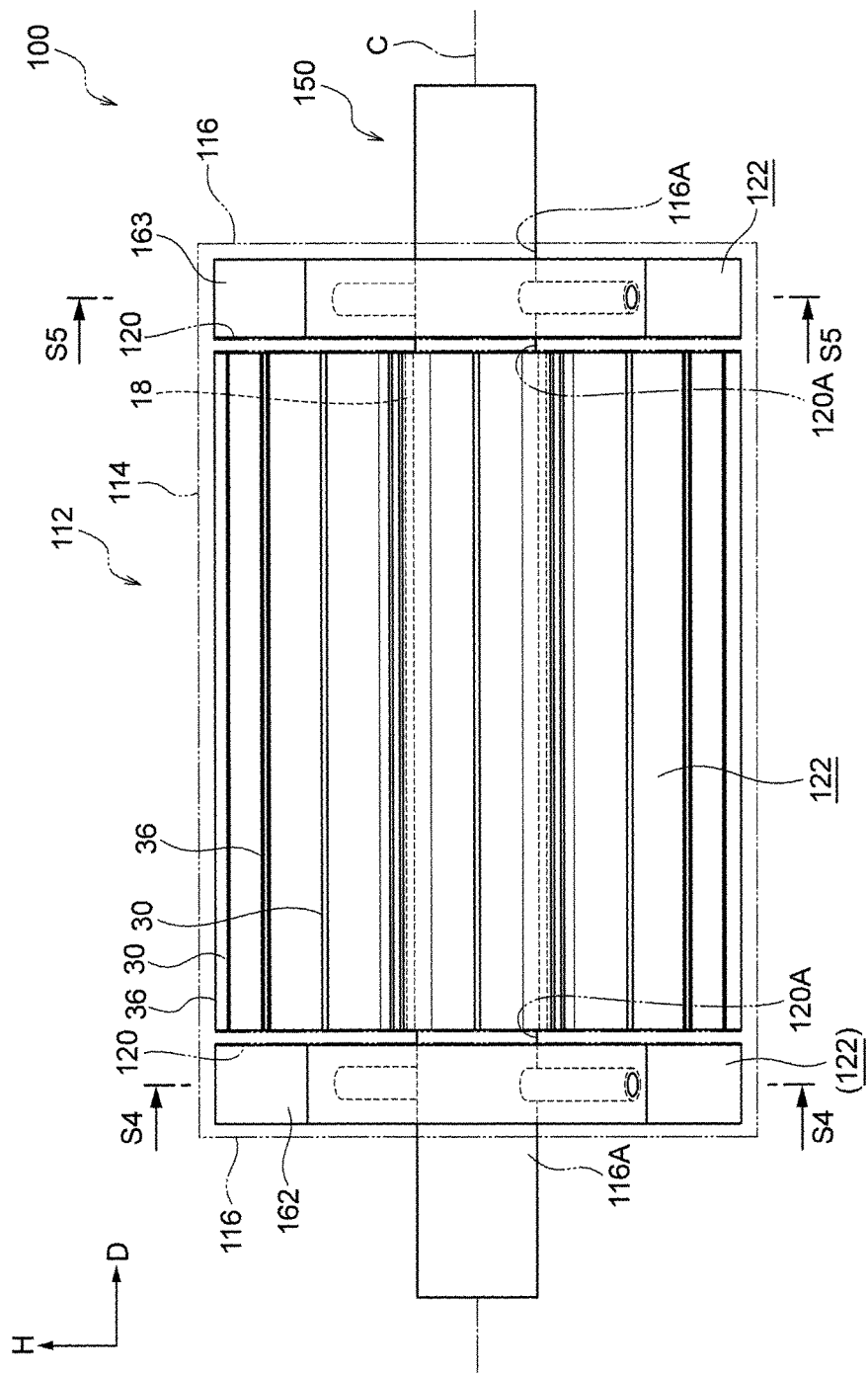
FIG. 13 is a side view illustrating an adsorption heat pump according to the second exemplary embodiment.

As illustrated in FIG. 12 and FIG. 13, a heat pump 100 according to the second exemplary embodiment includes a vessel 112, evaporator-condensers 30, and adsorption sections 36. The heat pump 100 includes a flow path mechanism 150 serving as an example of a flow path member through which respective heating media flow, and a switching device 90 (see FIG. 16).

Vessel

As illustrated in FIG. 12, FIG. 13, FIG. 16, and FIG. 17, the vessel 112 is configured including a circular tube shaped main body portion 114 that extends along the device depth direction, a pair of lid portions 116 attached to both device depth direction end portions of the main body portion 114, and an axial pipe 18 having an axial line C of the main body portion 114 as its axis. The vessel 112 includes a pair of separating portions 120 that are disposed at both device depth direction end portions of the evaporator-condensers 30 and the adsorption sections 36, and that separate the interior of the vessel 112 along the device depth direction (see FIG. 13).

As illustrated in FIG. 13, the axial pipe 18 is disposed between the pair of separating portions 120 in the interior of the main body portion 114, and respective through holes 120A, each having an outer diameter similar to the outer diameter of the axial pipe 18, are formed in the pair of the separating portions 120. Respective through holes 116A having similar shapes to those of the through holes 120A as viewed along the device depth direction are formed in the pair of the lid portions 116.

A space enclosed by the inner circumferential face of the main body portion 114, the pair of separating portions 120, and the outer circumferential face of the axial pipe 18, forms an adsorption space 122. The adsorption space 122 is vacuum deaerated, and water vapor is contained in the adsorption space 122. Respective spaces 170 are formed at one device depth direction side and the other device depth direction side, between the separating portions 120 and the lid portions 116. The spaces 170 are at atmospheric pressure, which differs from the pressure of the adsorption space 122.

Evaporator-Condenser

Figure 14:
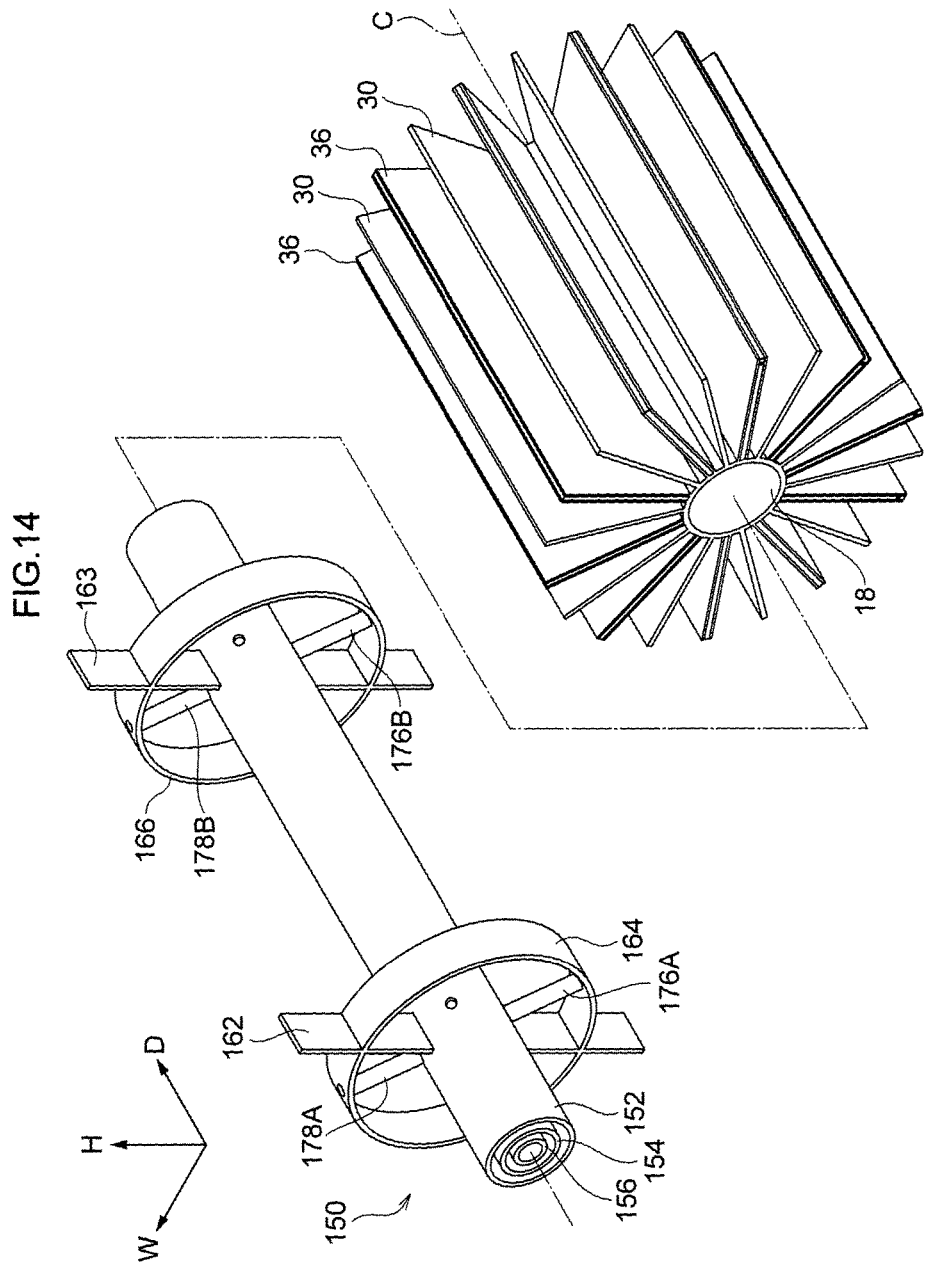
FIG. 14 is an exploded perspective view illustrating an adsorption heat pump according to the second exemplary embodiment.
Figure 17:
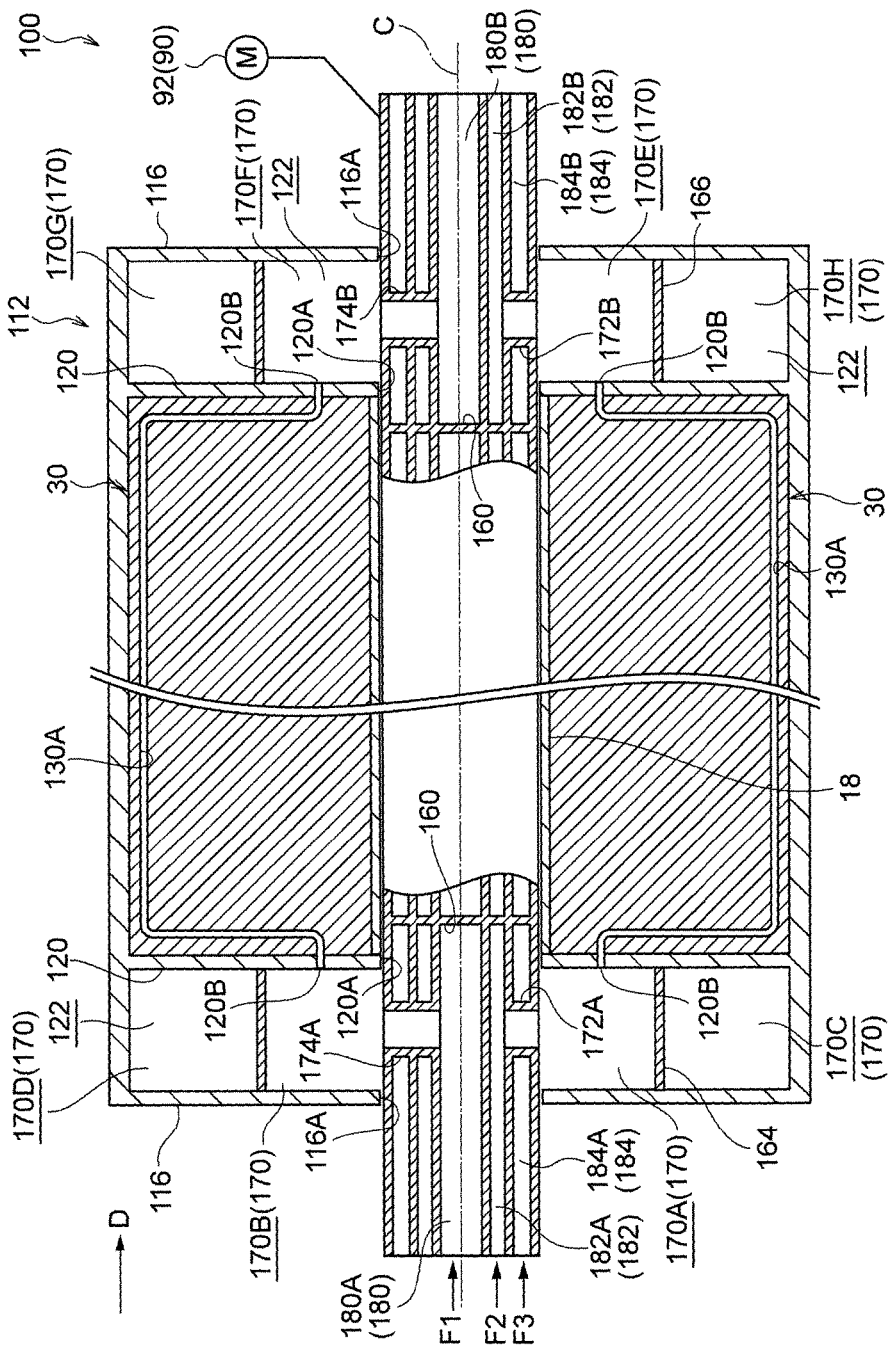
FIG. 17 is a cross-section taken along a line S7-S7 in FIG. 15, illustrating an adsorption heat pump according to the second exemplary embodiment.

As illustrated in FIG. 14, the evaporator-condensers 30 are rectangular plate shaped, and both device depth direction end portions of each of the evaporator-condensers 30 respectively contact the pair of separating portions 120 of the vessel 112 (see FIG. 17). A leading end portion of each of the evaporator-condensers 30 contacts the inner circumferential face of the main body portion 114 of the vessel 112.

As illustrated in FIG. 17, a flow path 130A is formed in the interior of each of the evaporator-condensers 30 so as to follow an edge of the evaporator-condenser 30. Through holes 120B are formed in the pair of separating portions 120 facing both end portions of the flow path 130A. The flow path 130A and the space 170 are thereby placed in communication with each other. Configuration is made such that the low temperature heating medium F1 or the intermediate temperature heating medium F2 flows in the flow path 130A.

Adsorption Section

Figure 16:
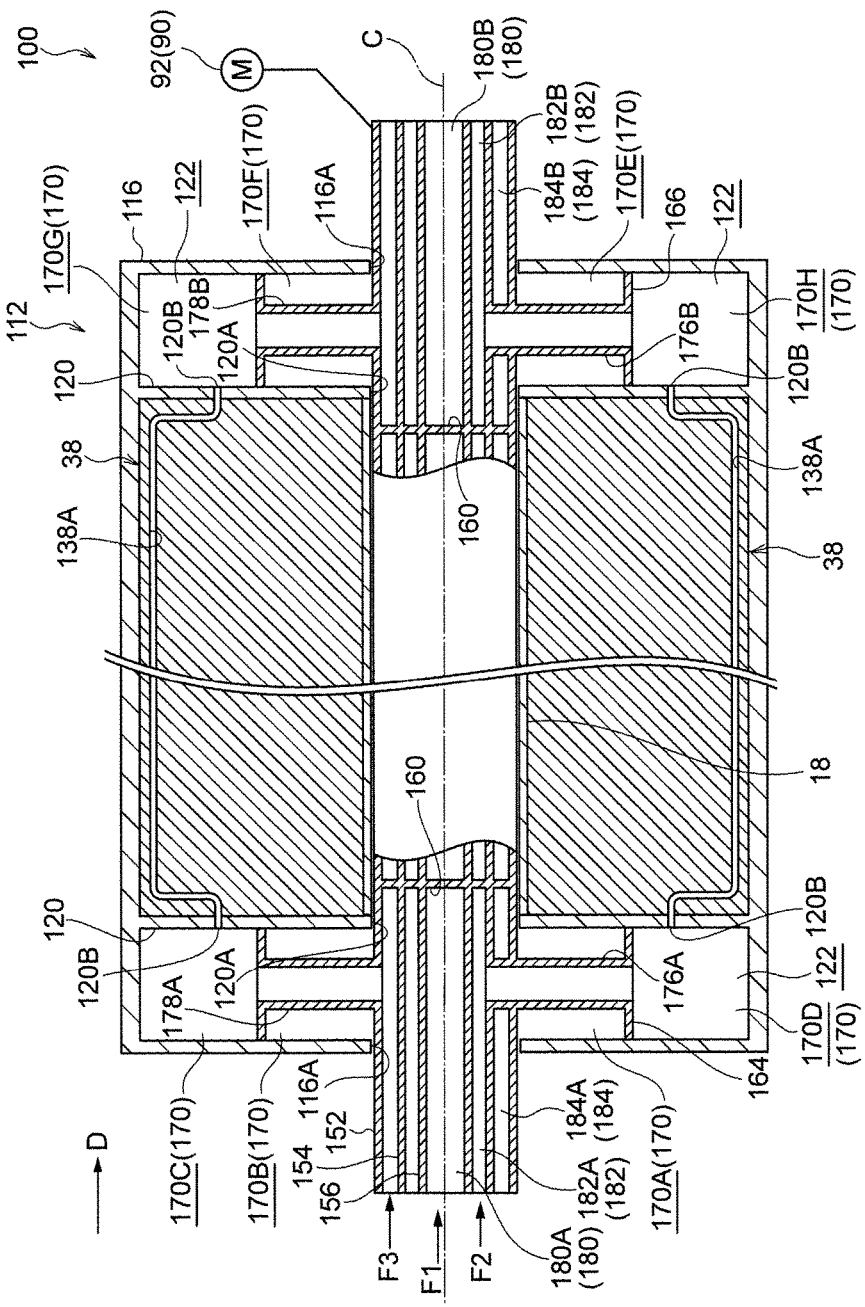
FIG. 16 is a cross-section taken along a line S6-S6 in FIG. 15, illustrating an adsorption heat pump according to the second exemplary embodiment.

As illustrated in FIG. 14, the adsorption sections 36 are rectangular plate shaped, and both device depth direction end portions of each of the adsorption sections 36 contacts the pair of separating portions 120 of the vessel 112 (see FIG. 16). The leading end portion of each of the adsorption sections 36 contacts the inner circumferential face of the main body portion 114 of the vessel 112.

As illustrated in FIG. 16, a flow path 138A is formed in the interior of each of the intermediate plates 38 so as to follow an edge of the intermediate plate 38 of the adsorption sections 36. Through holes 120B are formed to the pair of separating portions 120 opposing at both end portions of the flow path 138A. The flow path 138A and the space 170 are thereby placed in communication with each other. Configuration is made such that the intermediate temperature heating medium F2 or the high temperature heating medium F3 flows in the flow path 138A.

Flow Path Mechanism

As illustrated in FIG. 14, the flow path mechanism 150 includes a first pipe member 152 that penetrates through the axial pipe 18, and a second pipe member 154 disposed in the interior of the first pipe member 152 and separated from the inner circumferential face of the first pipe member 152 by a spacing. The flow path mechanism 150 includes a third pipe member 156 disposed in the interior of the second pipe member 154 and separated from the inner circumferential face of the second pipe member 154 by a spacing.

As illustrated in FIG. 16 and FIG. 17, both end sides of the first pipe member 152, the second pipe member 154, and the third pipe member 156 are exposed to the exterior of the vessel 112 from the lid portions 116 through the respective through holes 120A, formed in the pair of separating portions 120 described above, and through the respective through holes 116A formed in the pair of lid portions 116. A bearing shaft, not illustrated in the drawings, is provided between the hole edges of the through holes 116A of the pair of lid portions 116, and the outer circumferential face of the first pipe member 152, and the flow path mechanism 150 is capable of rotating about the axial line C (see the arrow F in FIG. 12). A sealing member, not illustrated in the drawings, seals between the hole edges of the through holes 116A and the outer circumferential face of the first pipe member 152.

As illustrated in FIG. 16 and FIG. 17, the flow path mechanism 150 includes a pair of circular partitioning plates 160 that partition the interior of the first pipe member 152 into a space at one device depth direction end side (the left side in the drawings) and a space at the other device depth direction end side (the right side in the drawings). The pair of partitioning plates 160 is integrally formed at the first pipe member 152, the second pipe member 154, and the third pipe member 156.

Figure 15:
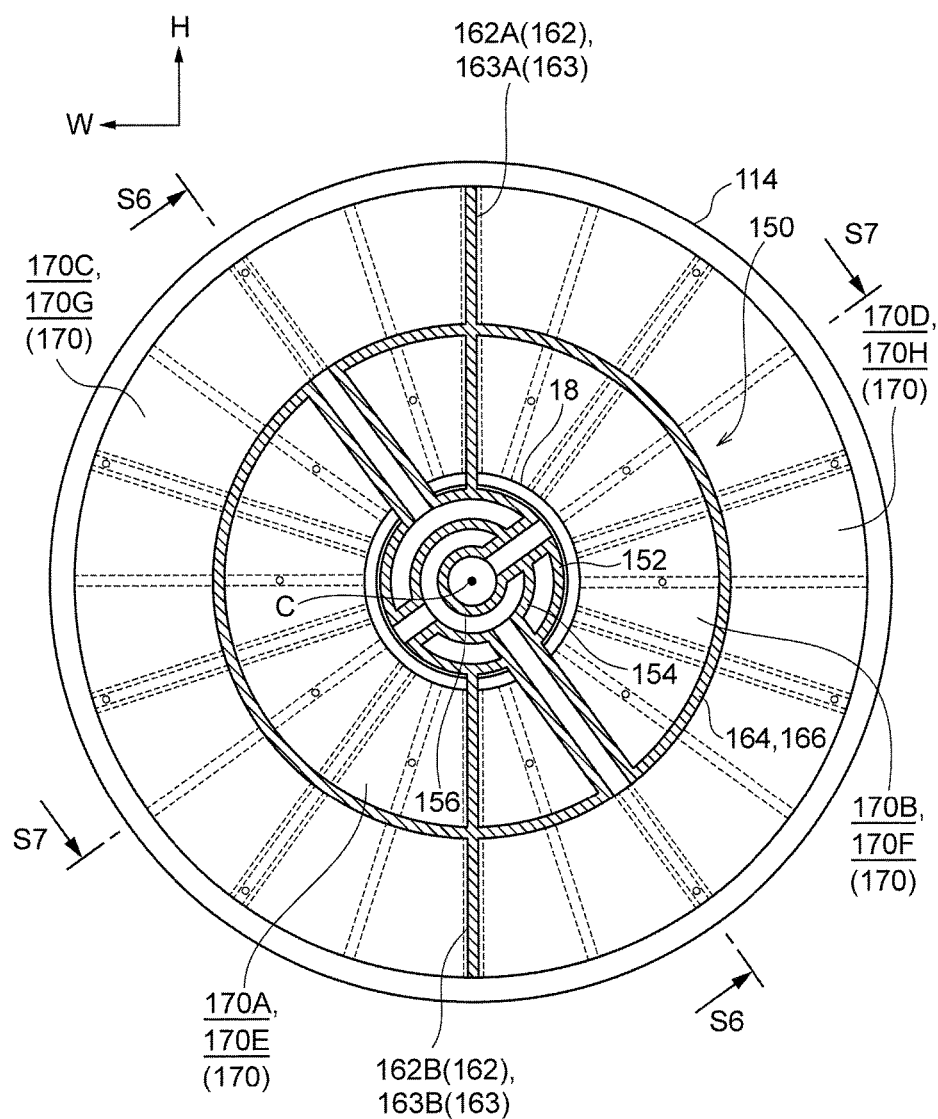
FIG. 15 is a cross-section taken along lines S4-S4, S5-S5 in FIG. 13, illustrating an adsorption heat pump according to the second exemplary embodiment.

As illustrated in FIG. 14 and FIG. 15, at the one device depth direction end side, the flow path mechanism 150 includes a partitioning plate 162 that partitions the space 170 between the separating portions 120 and the lid portions 116 in the circumferential direction of the first pipe member 152. At the other device depth direction end side, the flow path mechanism 150 includes a partitioning plate 163 that partitions the space 170 between the separating portions 120 and the lid portions 116.

A base end portion of the partitioning plate 162 is coupled to the outer circumferential face of the first pipe member 152, and, as viewed along the device depth direction, the partitioning plate 162 includes partitioning plates 162A, 162B having leading end portions extending in the radial direction of the first pipe member 152 that contact the inner circumferential face of the main body portion 114. As viewed along the device depth direction, the partitioning plate 162A and the partitioning plate 162B are disposed so as to have point symmetry about the axial line C. The partitioning plates 162A, 162B are integrally formed with the first pipe member 152. A sealing member, not illustrated in the drawings, seals between the leading end portions of the partitioning plates 162A, 162B and the inner circumferential face of the main body portion 114.

A base end portion of the partitioning plate 163 is coupled to the outer circumferential face of the first pipe member 152, and, as viewed along the device depth direction, includes partitioning plates 163A, 163B having leading end portions extending in the radial direction of the first pipe member 152 that contact the inner circumferential face of the main body portion 114. As viewed along the device depth direction, the partitioning plate 163A and the partitioning plate 163B are disposed in similar positions along the circumferential direction of the first pipe member 152 to the positions of the partitioning plate 162A and the partitioning plate 162B, described above. A sealing member, not illustrated in the drawings, seals between the leading end portions of the partitioning plate 163A, 163B and the inner circumferential face of the main body portion 114.

As illustrated in FIG. 14 and FIG. 15, the flow path mechanism 150 includes a ring shaped partitioning plate 164 that partitions the space 170 into two spaces in the radial direction of the first pipe member 152 at the one device depth direction end side. The partitioning plate 164 is integrally formed at the partitioning plate 162. A sealing member, not illustrated in the drawings, seals between one edge portion of the partitioning plate 164 and the lid portion 116, and between the other edge portion of the partitioning plate 164 and the separated portion 120.

The flow path mechanism 150 includes a ring shaped partitioning plate 166 that partitions the space 170 into two spaces in the radial direction of the first pipe member 152 at the other device depth direction end side. The partitioning plate 166 is integrally formed at the partitioning plate 163. A sealing member, not illustrated in the drawings, seals between one edge portion of the partitioning plate 166 and the lid portion 116, and between the other edge portion of the partitioning plate 166 and the separated portion 120.

In the following explanation, in a case in which the partitioning plates 162, 163, which rotate together with the first pipe member 152, partition the space 170 in the device width direction, a space in the space 170 that is partitioned by the partitioning plate 164 and the partitioning plate 162, that is at the first pipe member 152 side, and that is positioned at the left side of FIG. 15, is referred to as a space 170A. A space at the opposite side of the partitioning plate 162 to the space 170A is referred to as a space 170B. A space in the space 170 at the opposite side of the partitioning plate 164 to the space 170A is referred to as a space 170C, and a space in the space 170 at the opposite side of the partitioning plate 164 to the space 170B is referred to as a space 170D.

A space at the other device depth direction end side of the space 170 disposed in a similar position to the space 170A as viewed along the device depth direction is referred to as a space 170E. A space disposed in a similar position to the space 170B as viewed along the device depth direction is referred to as a space 170F. A space disposed in a similar position to the space 170C as viewed along the device depth direction is referred to as a space 170G, and a space disposed at a similar position to the space 170D as viewed along the device depth direction is referred to as a space 170H.

As illustrated in FIG. 17, the flow path mechanism 150 includes a coupling pipe 172A that couples together the first pipe member 152 and the second pipe member 154 at a portion at the one end side of the first pipe member 152 and at a portion in contact with the space 170A. The flow path mechanism 150 also includes a coupling pipe 172B that couples together the first pipe member 152 and the second pipe member 154 at a portion at the other end side of the first pipe member 152 and at a portion in contact with the space 170E. The coupling pipes 172A, 172B thereby place a space between the second pipe member 154 and the third pipe member 156 (a flow path 182, described later), in communication with the spaces 170A, 170E.

As illustrated in FIG. 17, the flow path mechanism 150 includes a coupling pipe 174A that couples together the first pipe member 152 and the third pipe member 156 at a portion at the one end side of the first pipe member 152 and at a portion in contact with the space 170B. The flow path mechanism 150 also includes a coupling pipe 174B that couples together the first pipe member 152 and the third pipe member 156 at a portion at the other end side of the first pipe member 152 and at a portion in contact with the space 170F. The coupling pipes 174A, 174B thereby place a space in the interior of the third pipe member 156 (a flow path 180, described later) in communication with the spaces 170B, 170F.

As illustrated in FIG. 16, the flow path mechanism 150 includes a coupling pipe 178A that couples together the first pipe member 152 and the partitioning plate 164 at a portion at the one end side of the first pipe member 152 and at a portion facing the space 170C. The flow path mechanism 150 also includes a coupling pipe 178B that couples together the first pipe member 152 and the partitioning plate 166 at a portion at the other end side of the first pipe member 152 and at a portion facing the space 170G. The coupling pipes 178A, 178B thereby place a space between the first pipe member 152 and the second pipe member 154 (a flow path 184, described later) in communication with the spaces 170C, 170G.

As illustrated in FIG. 16, the flow path mechanism 150 includes a coupling pipe 176A that couples together the second pipe member 154 and the partitioning plate 164 at a portion at the one end side of the first pipe member 152 and at a portion facing the space 170D. The flow path mechanism 150 also includes a coupling pipe 176B that couples together the second pipe member 154 and the partitioning plate 166 at a portion at the other end side of the first pipe member 152 and at a portion facing the space 170H. The coupling pipes 176A, 176B thereby place a space between second pipe member 154 and the third pipe member 156 (a flow path 182, described later), in communication with the space 170D, 170H.

The interior of the third pipe member 156 configures the flow path 180 (an example of a first flow path) through which the low temperature heating medium F1 (an example of a first heating medium) flows. The space between the second pipe member 154 and the third pipe member 156 configures a flow path 182 (an example of a second flow path and a third flow path) through which the intermediate temperature heating medium F2 (an example of a second heating medium and a third heating medium) flows. The space between the first pipe member 152 and the second pipe member 154 configures the flow path 184 (an example of a fourth flow path) through which the high temperature heating medium F3 (an example of a fourth heating medium) flows.

In the following explanation, as illustrated in FIG. 16 and FIG. 17, a portion of the flow path 180 partitioned by the partitioning plate 160 at the one device depth direction end side is referred to as a flow path 180A, and a portion at the other end side is referred to as a flow path 180B. A portion of the flow path 182 partitioned by the circular partitioning plate 160 at the one device depth direction end side is referred to as a flow path 182A, and a portion at the other end side is referred to as a flow path 182B. A portion of the flow path 184 partitioned by the partitioning plate 160 at the one device depth direction end side is referred to as a flow path 184A, and a portion at the other end side is referred to as a flow path 184B.

In this configuration, as illustrated in FIG. 17, the low temperature heating medium F1 is supplied to the flow path 180A, and flows into the space 170B through the coupling pipe 174A. The low temperature heating medium F1 that has flowed into the space 170B flows, through the one end portion of flow path 130A, into the interior of the flow path 130A of the evaporator-condenser 30 disposed at the opposite side of the separating portion 120 to the space 170B. The low temperature heating medium F1 that has flowed into the interior of the flow path 130A flows out from the other end portion of the flow path 130A and flows into the space 170F. The low temperature heating medium F1 that has flowed into the space 170F flows into the flow path 180B through the coupling pipe 174B and is expelled to the exterior.

As illustrated in FIG. 16, the intermediate temperature heating medium F2 is supplied to the flow path 182A and flows into the space 170D through the coupling pipe 176A. The intermediate temperature heating medium F2 that has flowed into the space 170D flows, through the one end portion of the flow path 138A, into the interior of the flow path 138A of the intermediate plate 38 of the adsorption section 36 disposed at the opposite side of the separating portion 120 to the space 170D. The intermediate temperature heating medium F2 that has flowed into the interior of the flow path 138A flows out from the other end portion of the flow path 138A and flows into the space 170H. The intermediate temperature heating medium F2 that has flowed into the space 170H flows into the flow path 182B through the coupling pipe 176B and is expelled to the exterior.

The intermediate temperature heating medium F2 also flows through a flow path different from the flow path described above. More specifically, as illustrated in FIG. 17, the intermediate temperature heating medium F2 is supplied to the flow path 182A and flows into the space 170A through the coupling pipe 172A. Moreover, the intermediate temperature heating medium F2 that has flowed into the space 170A flows, through the one end portion of the flow path 130A, into the interior of the flow path 130A of the evaporator-condenser 30 disposed at the opposite side of the separating portion 120 to the space 170A. The intermediate temperature heating medium F2 that has flowed into the interior of the flow path 130A flows out from the other end portion of the flow path 130A and flows into the space 170E. The intermediate temperature heating medium F2 that has flowed into the space 170E flows into the flow path 182B through the coupling pipe 172B and is expelled to the exterior.

As illustrated in FIG. 16, the high temperature heating medium F3 is supplied to the flow path 184A and flows into the space 170C through the coupling pipe 178A. The high temperature heating medium F3 that has flowed into the space 170C flows, through the one portion of the flow path 138A, into the interior of the flow path 138A of the intermediate plate 38 of the adsorption section 36 disposed at the opposite side of the separating portion 120 to the space 170C. The high temperature heating medium F3 that has flowed into the interior of the flow path 138A flows out from the other end portion of the flow path 138A and flows into the space 170G. The high temperature heating medium F3 that has flowed into the space 170G flows into the flow path 184B through the coupling pipe 178B and is expelled to the exterior.

Switching Device

As illustrated in FIG. 16 and FIG. 17, the switching device 90 includes a motor 92 that serves as a driving member for continuously rotating the flow path mechanism 150 about the axial line C.

Figure 18:
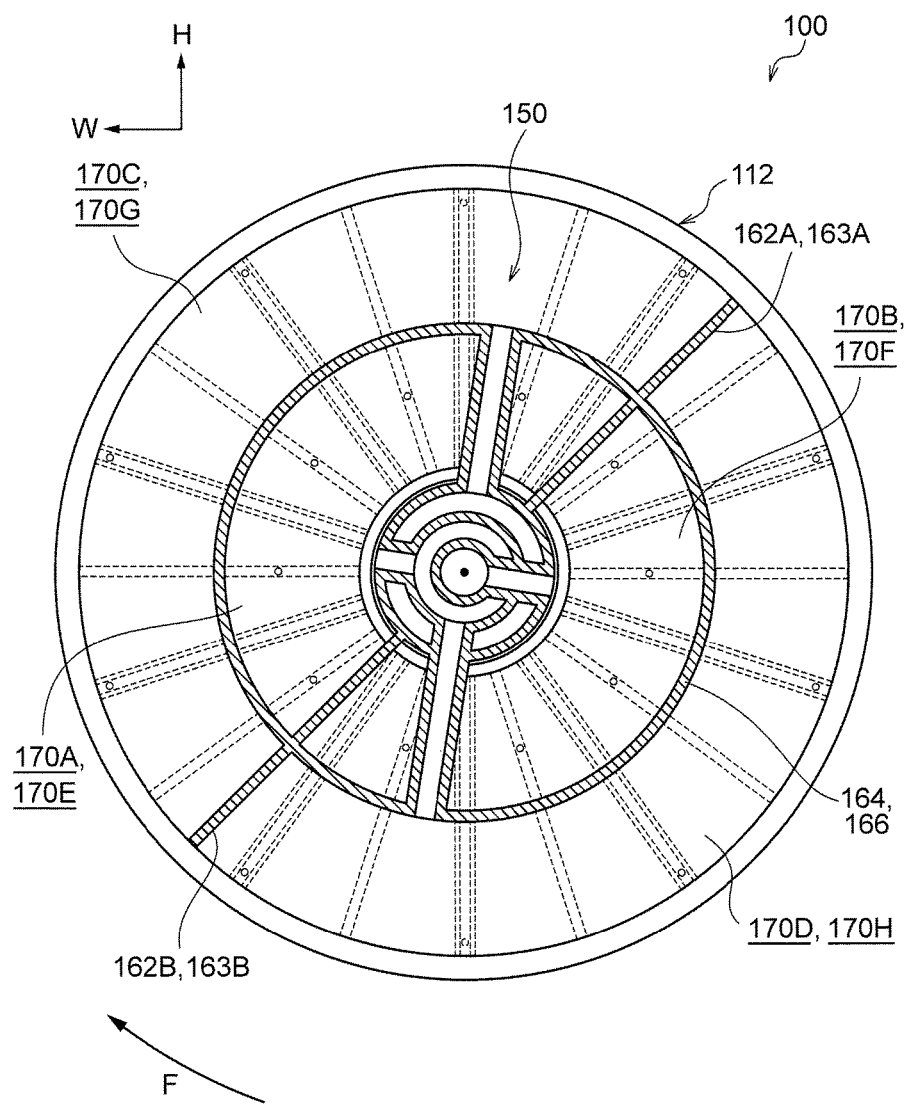
FIG. 18 is a cross-section illustrating an adsorption heat pump according to the second exemplary embodiment.
Figure 19:
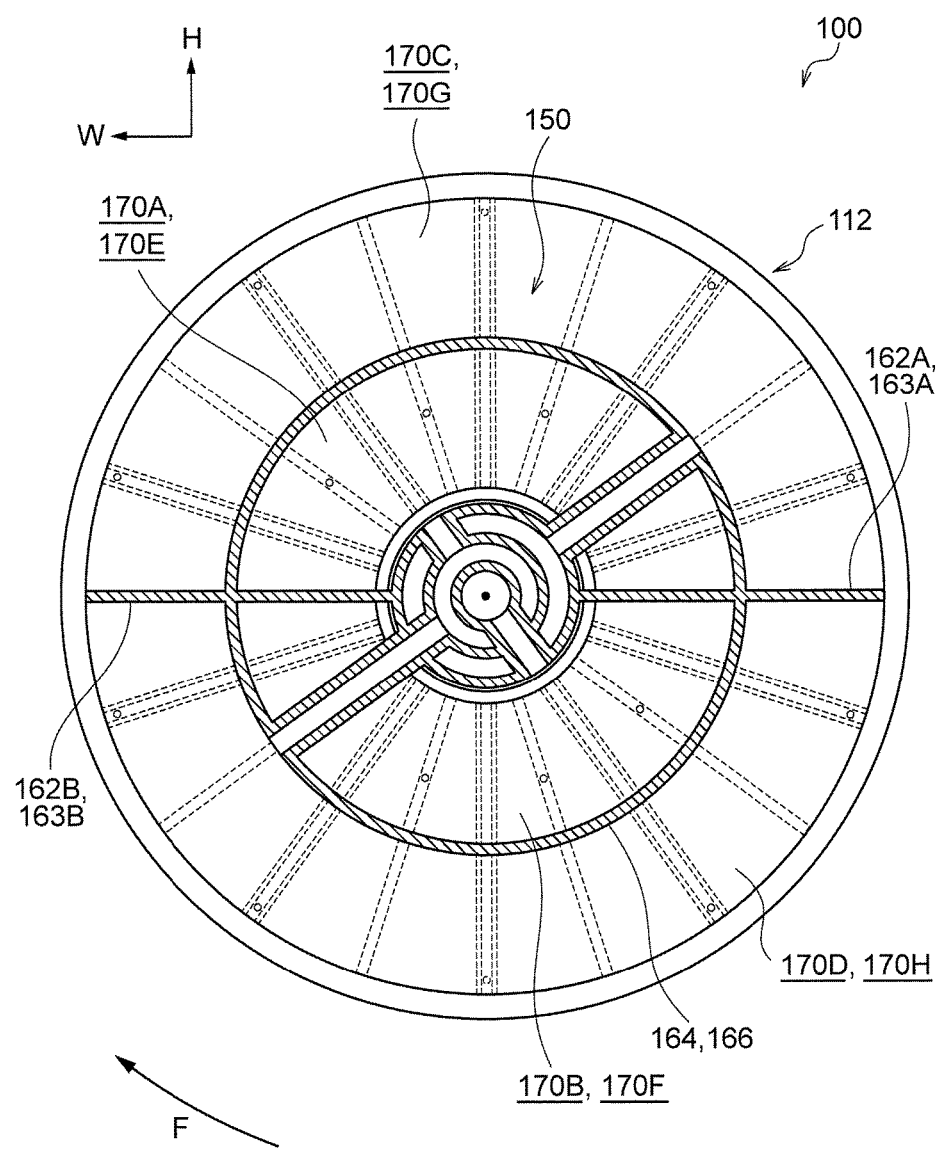
FIG. 19 is a cross-section illustrating an adsorption heat pump according to the second exemplary embodiment.
Figure 20:
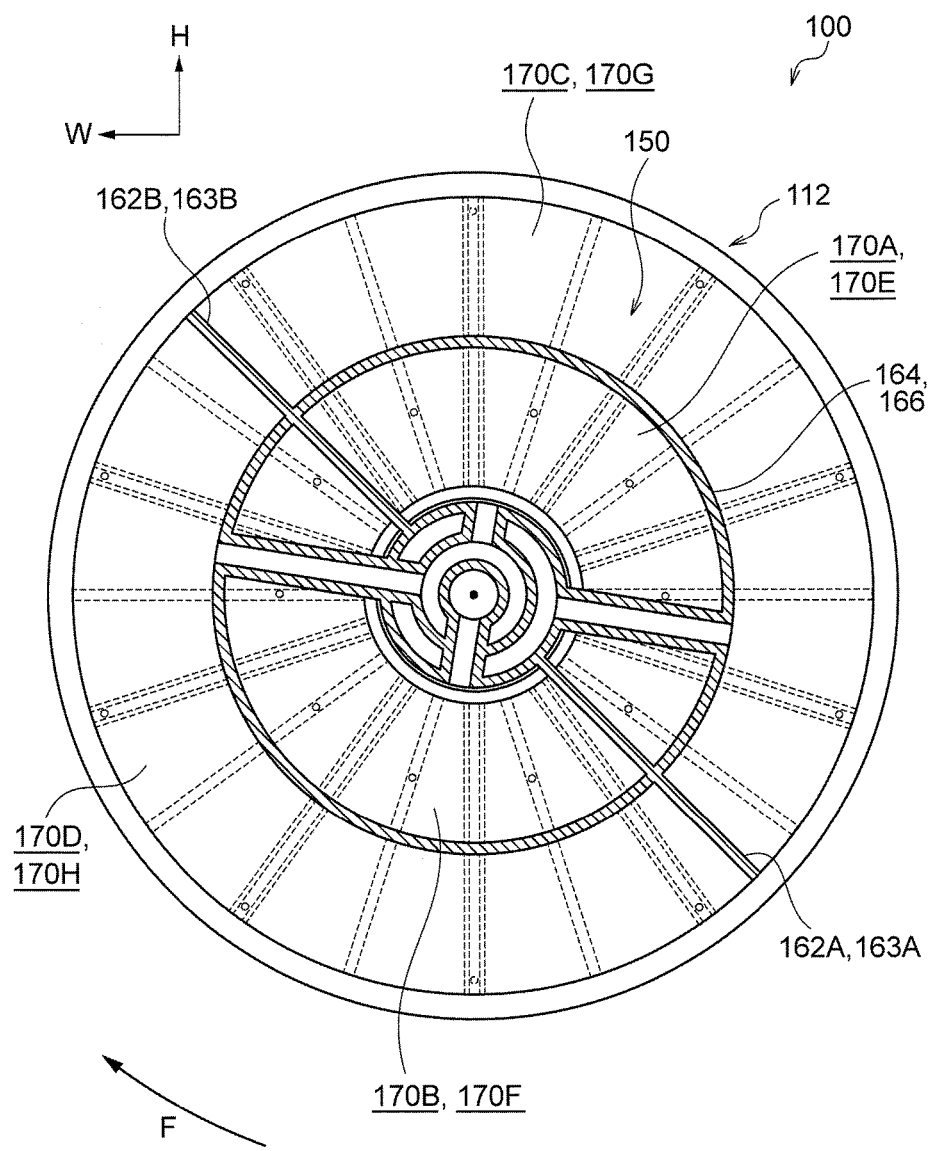
FIG. 20 is a cross-section illustrating an adsorption heat pump according to the second exemplary embodiment.

In this configuration, the driving force of the motor 92 rotates the flow path mechanism 150 (see the arrow F) as illustrated in FIG. 18, FIG. 19, and FIG. 20, so as to also rotate each of the spaces 170.

The operation of the second exemplary embodiment is similar to the operation of the first exemplary embodiment except for the direction in which the heating media flow into the adsorption section 36 and the evaporator-condenser 30, and the direction in which the heating media are expelled from the adsorption section 36 and the evaporator-condenser 30.

Although the present disclosure has described specific exemplary embodiments in detail, there is no limitation to the exemplary embodiments of the present disclosure, and it will be apparent to a person of ordinary skill in the art that various other exemplary embodiments are possible within the scope of the present disclosure. For example, although the flow path mechanism 50, 150 is caused to rotate in the exemplary embodiments above, the evaporator-condenser 30 and the adsorption section 36 may be caused to rotate as long as the flow path mechanism 50, 150 is rotated (moved) relative to the evaporator-condenser 30 and the adsorption section 36.

Although not specifically explained in the exemplary embodiments above, a porous body or the like may be provided at hold water on the plate face of the evaporator-condenser 30.

Although water vapor was employed as the adsorbate in the exemplary embodiments above, vaporized ammonia may also be employed as the adsorbate.

Although explanation has been given of an example in which cooling is extracted from the evaporator-condenser 30 in the exemplary embodiments above, heat may be extracted from the evaporator-condenser 30.

Although the flow path mechanism 50, 150 is continuously rotated in the exemplary embodiments above, the rotation may be intermittent.

Although not specifically explained in the exemplary embodiments above, adsorption of water vapor by the adsorbent 40 may be chemical adsorption, or may be physical adsorption. Moreover, a chemical reaction or the like that produces similar effects may be employed instead of an adsorption reaction.

What is claimed is:

1. A heat pump comprising:

a vessel being an adsorption space including:

an adsorbate and a plurality of evaporator-condensers that are arranged separated by spacings in the adsorption space, that generate the adsorbate through exchanging heat with a first heating medium, and that condense the adsorbate through exchanging heat with a second heating medium;

a plurality of adsorbents that are alternately arranged with the evaporator-condensers in the adsorption space at separations from the evaporator-condensers, that adsorb the adsorbate generated by the evaporator-condensers through exchanging heat with a third heating medium, and that desorb the adsorbate through exchanging heat with a fourth heating medium that is at a higher temperature than the third heating medium;

a flow path that includes a first flow path configured to receive the first heating medium, a second flow path configured to receive the second heating medium, a third flow path configured to receive the third heating medium, and a fourth flow path configured to receive the fourth heating medium, such that the evaporator-condenser that generates the adsorbate and the adsorbent that adsorbs the adsorbate face each other, and the evaporator-condenser that condenses the adsorbate and the adsorbent that desorbs the adsorbate face each other; and a switching device that includes a motor that is configured to sequentially switch from having an evaporator-condenser generate the adsorbate and an adsorbent adsorb the adsorbate, to having an evaporator-condenser condense the adsorbate and an adsorbent desorb the adsorbate, by causing the flow path to move relative to the adsorbents and the evaporator-condensers, such that the evaporator-condenser that generates the adsorbate and the adsorbent that adsorbs the adsorbate face each other, and the evaporator-condenser that condenses the adsorbate and the adsorbent that desorbs the adsorbate face each other, wherein:

the evaporator-condensers and the adsorbents are alternately arranged in a continuous annular structure within the vessel so as to be separated by spacings; and the switching device causes the flow path to rotate relative to the adsorbents and the evaporator-condensers about an axis of a center of a circle in which the evaporator-condensers and the adsorbents are arranged as viewed from the one direction.

2. The heat pump of claim 1, wherein:

the evaporator-condensers and the adsorbents are rectangular plate shaped; and a plate face of the evaporator-condensers and a plate face of the adsorbents face along a circumferential direction of the circle in which the evaporator-condensers and the adsorbents are arranged as viewed from the one direction.

3. The heat pump of claim 1, wherein the flow path includes a first pipe, a second pipe that is disclosed in an interior of the first pipe, and a third pipe that is disposed in an interior of the second pipe.

4. The heat pump of claim 1, wherein the flow path includes an axial pipe, a first pipe that penetrates through the axial pipe, and a partitioning plate that partitions a portion between the first pipe and the axial pipe.

* * * * *